United States Patent
Lee et al.

(10) Patent No.: US 10,554,966 B2
(45) Date of Patent: Feb. 4, 2020

(54) MULTI-VIEW IMAGE ENCODING/DECODING METHOD AND APPARATUS

(71) Applicant: SAMSUNG ELECTRONICS CO., LTD., Suwon-si (KR)

(72) Inventors: Jin-young Lee, Suwon-si (KR); Min-woo Park, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 103 days.

(21) Appl. No.: 15/517,794

(22) PCT Filed: Sep. 21, 2015

(86) PCT No.: PCT/KR2015/009892
§ 371 (c)(1),
(2) Date: Apr. 7, 2017

(87) PCT Pub. No.: WO2016/056772
PCT Pub. Date: Apr. 14, 2016

(65) Prior Publication Data
US 2017/0318287 A1 Nov. 2, 2017

Related U.S. Application Data

(60) Provisional application No. 62/105,995, filed on Jan. 21, 2015, provisional application No. 62/060,729, filed on Oct. 7, 2014.

(51) Int. Cl.
*H04N 19/103* (2014.01)
*H04N 19/159* (2014.01)
(Continued)

(52) U.S. Cl.
CPC ......... *H04N 19/103* (2014.11); *H04N 19/159* (2014.11); *H04N 19/40* (2014.11);
(Continued)

(58) Field of Classification Search
None
See application file for complete search history.

(56) References Cited

U.S. PATENT DOCUMENTS

| 9,628,823 B2 | 4/2017 | Gomila et al. |
| 2010/0061447 A1 | 3/2010 | Tu et al. |

(Continued)

FOREIGN PATENT DOCUMENTS

| CN | 103503453 A | 1/2014 |
| KR | 10-2012-0116363 A | 10/2012 |

(Continued)

OTHER PUBLICATIONS

Communication issued Jun. 27, 2018, issued by the Korean Intellectual Property Office in counterpart Korean Patent Application No. 10-2017-7009544.

(Continued)

*Primary Examiner* — Mark Roz
(74) *Attorney, Agent, or Firm* — Sughrue Mion, PLLC

(57) ABSTRACT

Provided is a method of decoding a multi-view image, the method including obtaining, from a bitstream, an intra skip flag indicating whether a current block included in a depth image of the multi-view image is to be reconstructed based on an intra skip mode; obtaining, from the bitstream, intra skip prediction mode information indicating an intra prediction mode to be used for the current block, from among a plurality of intra prediction modes, when the intra skip flag indicates that the current block is to be reconstructed based on the intra skip mode; determining predicted values of samples included in the current block according to an intra prediction method indicated by the intra skip prediction mode information; and reconstructing the current block by determining reconstructed values of the samples, based on the predicted values of the samples.

6 Claims, 33 Drawing Sheets

(51) Int. Cl.
*H04N 19/40* (2014.01)
*H04N 19/105* (2014.01)
*H04N 19/11* (2014.01)
*H04N 19/114* (2014.01)
*H04N 19/184* (2014.01)

(52) U.S. Cl.
CPC ............ *H04N 19/105* (2014.11); *H04N 19/11* (2014.11); *H04N 19/114* (2014.11); *H04N 19/184* (2014.11)

(56) References Cited

U.S. PATENT DOCUMENTS

| | | | |
|---|---|---|---|
| 2011/0090967 A1* | 4/2011 | Chen | H04N 19/70 375/240.16 |
| 2013/0266232 A1 | 10/2013 | Sato | |
| 2014/0002594 A1 | 1/2014 | Chan et al. | |
| 2014/0003518 A1 | 1/2014 | Bang et al. | |

FOREIGN PATENT DOCUMENTS

| | | |
|---|---|---|
| KR | 10-2013-0086980 A | 8/2013 |
| KR | 10-2013-0118250 A | 10/2013 |
| KR | 10-1350597 B1 | 1/2014 |

OTHER PUBLICATIONS

Communication dated Sep. 29, 2017, from the European Patent Office in counterpart European Application No. 15849437.7.
Eunyong Son et al.,"3D-CE6.h Intra Skip mode for depth map I-slices", Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, Document: JCT2-A0088, (4 Pages Total).
Dmytro Rusanovskyy et al., "3D-AVC Test Model 9", Joint Collaborative Team on 3D Video Coding Extensions of ITU-T SG 16 WP 3 and ISO/IEC JTC 1/SC 29/WG 11, 7th Meeting: San Jose, US, Jan. 11-17, 2014, Document: JCT3V-G1003, (63 Pages Total).
Yi-Wen Chen et al., "3D-CE2: Single depth intra mode for 3D-HEVC", Joint Collaborative Team on 3D Video Coding Extensions of ITU-T SG 16 WP 3 and ISO/IEC JTC 1/SC 29/WG 11, 9th Meeting: Sapporo, JP, Jul. 3-9, 2014, Document: JCT3V-I0095, (4 Pages Total).
Jin Young Lee et al., "3D-CE1: Depth intra skip (DIS) mode", Joint Collaborative Team on 3D Video Coding Extensions of ITU-T SG 16 WP 3 and ISO/IEC JTC 1/SC 29/WG 11, 11th Meeting: Geneva, CH, Feb. 12-18, 2015, Document: JCT3V-K0033, (5 Pages Total).
Gerhard Tech et al., "3D-HEVC Draft Text 7", Joint Collaborative Team on 3D Video Coding Extensions of ITU-T SG 16 WP 3 and ISO/IEC JTC 1/SC 29/WG 11, 11th Meeting: Geneva, CH, Feb. 12-15, 2015, Document: JCT3V-K1001-v1, (116 Pages Total).
Communication dated Dec. 15, 2017, issued by the Korean Intellectual Property Office in corresponding Korean Application No. 10-2017-7009544.
International Search Report dated Feb. 15, 2016 issued by International Searching Authority in counterpart International Application No. PCT/KR2015/009892 (PCT/ISA/210).
Written Opinion dated Feb. 15, 2016 issued by International Searching Authority in counterpart International Application No. PCT/KR2015/009892 (PCT/ISA/237).
Kwan-Jung Oh et al., "Depth intra skip prediction for 3D video coding,", Dec. 3-6, 2012, p. 1-p. 4, 6 pages total, Signal & Information Processing Association Annual Summit and Conference (APSIPA ASC) Asia Pacific, California, USA.
Communication dated Apr. 26, 2019, issued by the Chinese Patent Office in counterpart Chinese Application No. 201580065653.0.

* cited by examiner

| sps_3d_extension( ) { | Descriptor |
|---|---|
|   for( d = 0; d <= 1; d++ ) { | |
|     iv_di_mc_enabled_flag[ d ] | u(1) |
|     iv_mv_scal_enabled_flag[ d ] | u(1) |
|     if( d == 0 ) { | |
|       log2_ivmc_sub_pb_size_minus3[ d ] | ue(v) |
|       iv_res_pred_enabled_flag[ d ] | u(1) |
|       depth_ref_enabled_flag[ d ] | u(1) |
|       vsp_mc_enabled_flag[ d ] | u(1) |
|       dbbp_enabled_flag[ d ] | u(1) |
|     } else { | |
|       tex_mc_enabled_flag[ d ] | u(1) |
|       log2_texmc_sub_pb_size_minus3[ d ] | ue(v) |
|       intra_contour_enabled_flag[ d ] | u(1) |
|       intra_dc_only_wedge_enabled_flag[ d ] | u(1) |
|       cqt_cu_part_pred_enabled_flag[ d ] | u(1) |
|       inter_dc_only_enabled_flag[ d ] | u(1) |
|       skip_intra_enabled_flag[ d ] | u(1) |
|     } | |
|   } | |
| } | |

| coding_unit( x0, y0, log2CbSize ) { | Descriptor |
|---|---|
|   if( transquant_bypass_enabled_flag ) | |
|     cu_transquant_bypass_flag | |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else if( SkipIntraEnabledFlag ) | |
|     skip_intra_flag[ x0 ][ y0 ] | |
|   if( !cu_skip_flag[ x0 ][ y0 ] && !skip_intra_flag[ x0 ][ y0 ] ){ | ae(v) |
|   …….. (SYNTAX FOR INTRA MODE & INTER MODE) | |
|   } | |
|     cu_extension( x0, y0, log2CbSize ) | |
|   if( DcOnlyFlag[ x0 ][ y0 ] \|\| <br>     ( !skip_intra_flag[ x0 ][ y0 ] && CuPredMode[ x0 ][ y0 ] == MODE_INTRA )) | |
|     depth_dcs( x0, y0, log2CbSize ) | |
|   if( !cu_skip_flag[ x0 ][ y0 ] && !skip_intra_flag[ x0 ][ y0 ] <br>     && !dc_only_flag[ x0 ][ y0 ] && !pcm_flag[ x0 ][ y0 ] ){ | |
|     …… | |
|     transform_tree( x0, y0, x0, y0, log2CbSize, 0, 0 ) | |
|   } | |
|   } | |
| } | |

SYNTAX 1: if( slice_type != I ), cu_skip_flag[ x0 ][ y0 ]

SYNTAX 2: else if( SkipIntraEnabledFlag ), skip_intra_flag[ x0 ][ y0 ]

SYNTAX 3: if( !cu_skip_flag[ x0 ][ y0 ] && !skip_intra_flag[ x0 ][ y0 ] ){ …….. (SYNTAX FOR INTRA MODE & INTER MODE) }

SYNTAX 4: cu_extension( x0, y0, log2CbSize )

SYNTAX 5: if( DcOnlyFlag[ x0 ][ y0 ] || ( !skip_intra_flag[ x0 ][ y0 ] && CuPredMode[ x0 ][ y0 ] == MODE_INTRA )) depth_dcs( x0, y0, log2CbSize ); if( !cu_skip_flag[ x0 ][ y0 ] && !skip_intra_flag[ x0 ][ y0 ] && !dc_only_flag[ x0 ][ y0 ] && !pcm_flag[ x0 ][ y0 ] ){ transform_tree( x0, y0, x0, y0, log2CbSize, 0, 0 ) }

| cu_extension( x0, y0, log2CbSize ) { | Descriptor |
|---|---|
| if( skip_intra_flag[ x0 ][ y0 ] ) | |
| skip_intra_mode_idx[ x0 ][ y0 ] | ae(v) |
| else { | |
| ...... | |
| } | |
| } | |

SYNTAX 6 brackets the rows: `if( skip_intra_flag[ x0 ][ y0 ] )` and `skip_intra_mode_idx[ x0 ][ y0 ]`.

TRANSFORMATION UNIT (1300)

PREDICTION MODE (1310)

TRANSFORMATION UNIT SIZE (1320)

CODING UNIT (1510)

MULTI-VIEW IMAGE ENCODING/DECODING METHOD AND APPARATUS

TECHNICAL FIELD

The present invention relates to video encoding and decoding methods based on prediction of a multi-view image, and more particularly, to multi-view video encoding and decoding methods of encoding and decoding an image without using residual data.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial domain is transformed into coefficients of a frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial domain, coefficients of a frequency domain are easily compressed. In particular, since an image pixel value of a spatial domain is expressed according to a prediction error via inter prediction or intra prediction of a video codec, when frequency transformation is performed on the prediction error, a large amount of data may be transformed to 0. An amount of data of an image may be reduced by replacing data that is consecutively and repeatedly generated with small-sized data.

A multi-view video codec encodes and decodes a base-view image and one or more dependent-view images. The base-view image and the one or more dependent-view images respectively include a texture picture and a depth picture corresponding to a view. An amount of data of a multi-view image may be reduced in such a manner that redundancy of the base-view image and the one or more dependent-view images and redundancy between the texture picture and the depth picture are removed.

A depth image is an image indicating the distance between a viewpoint and an object and is used to synthesize texture images from certain viewpoints. The depth image is invisible to humans, similarly to a texture image, and thus it is difficult for humans to recognize distortion of the depth image.

Generally, an encoding method having high coding efficiency has a high distortion rate. Thus, an encoding method having a distortion rate which is recognizable to humans is not generally used even when this method has high coding efficiency. However, since distortion of a depth image is difficult for humans to recognize, a multi-view image may be encoded using an encoding method having high coding efficiency to increase overall coding efficiency. Accordingly, an encoding method having higher coding efficiency than coding efficiency of a method of encoding a texture image may be suggested as a method of encoding a depth image.

DETAILED DESCRIPTION OF THE INVENTION

Technical Problem

Texture images and depth images for a plurality of viewpoints are needed to obtain a three-dimensional (3D) image. Thus, an amount of data required to store, transmit, and reproduce the 3D image is larger than that required to store, transmit, and reproduce a two-dimensional (2D) image. Accordingly, there is a need to develop various encoding methods to reduce the amount of data of the 3D image.

Technical Solution

In one embodiment, a method of decoding a multi-view image includes obtaining an intra skip flag from a bitstream, the intra skip flag indicating whether a current block included in a depth image of the multi-view image is to be reconstructed based on an intra skip mode; when the intra skip flag indicates that the current block is to be reconstructed based on the intra skip mode, obtaining intra skip prediction mode information from the bitstream, the intra skip prediction mode information indicating an intra prediction mode to be used for the current block among a plurality of intra prediction modes; determining predicted values of samples included in the current block according to an intra prediction method indicated using the intra skip prediction mode information; and reconstructing the current block by determining reconstructed values of the samples, based on the predicted values of the samples.

In one embodiment, the method may further include obtaining an intra skip enabled flag indicating whether the intra skip mode is available for a parent image data unit including the depth image. The obtaining of the intra skip flag may include obtaining the intra skip flag when the intra skip enabled flag indicates that the intra skip mode is available for the parent image data unit.

In one embodiment, the intra skip prediction mode information may indicate a horizontal mode, a vertical mode, a horizontal single mode, or a vertical single mode.

In one embodiment, the determining of the predicted values of the samples may include determining predicted values of the samples included in the current block to be the same as a value of a sample located in the same row as the samples included in the current block among samples adjacent to a left side of the current block when the intra skip prediction mode information indicates the horizontal mode, determining predicted values of the samples included in the current block to be the same as a value of a sample located in the same column as the samples included in the current block among samples adjacent to an upper side of the current block when the intra skip prediction mode information indicates the vertical mode, determining predicted values of the samples included in the current block to be the same as a value of a sample located at a predetermined position among the samples adjacent to the left side of the current block when the intra skip prediction mode information indicates the horizontal single mode, and determining predicted values of the samples included in the current block to be the same as a value of a sample located at a predetermined position among the samples adjacent to the upper side of the current block when the intra skip prediction mode information indicates the vertical single mode.

In one embodiment, an apparatus for decoding a multi-view image includes an intra skip flag obtainer configured to obtain an intra skip flag from a bitstream, the intra skip flag indicating whether a current block included in a depth image of the multi-view image is to be reconstructed based on an intra skip mode; an intra skip prediction mode information obtainer configured to obtain intra skip prediction mode information from the bitstream when the intra skip flag indicates that the current block is to be reconstructed according to the intra skip mode, the intra skip prediction mode information indicating an intra prediction mode to be used for the current block among a plurality of intra prediction modes; a predicted-value determiner configured to determine predicted values of samples included in the current block according to an intra prediction method indicated by the intra skip prediction mode information; and a reconstructor configured to determine reconstructed values of the samples, based on the predicted values of the samples.

In one embodiment, a method of encoding a multi-view image includes determining a method of encoding a current block included in a depth image of the multi-view image; generating an intra skip flag indicating whether the current block is encoded according to an intra skip mode, based on the determined encoding method; generating intra skip prediction mode information based on the determined encoding method when the current block is encoded according to the intra skip mode, the intra skip prediction mode information indicating an intra prediction mode used to predict the current block among a plurality of intra prediction modes; and transmitting a bitstream including the intra skip flag and the intra skip prediction mode information. The transmitting of the bitstream may include transmitting a bitstream excluding residual data of the current block.

In one embodiment, the method may further include determining an intra skip enabled flag indicating whether the intra skip mode is available for a parent image data unit including the depth image. The generating of the intra skip flag may include generating the intra skip flag when the intra skip enabled flag indicates that the intra skip mode is available for the parent image data unit.

In one embodiment, the intra skip prediction mode information may indicate a horizontal mode, a vertical mode, a horizontal single mode, or a vertical single mode.

In one embodiment, the horizontal mode may be an intra prediction mode in which predicted values of samples included in the current block are determined to be the same as a value of a sample located in the same row as the samples included in the current block among samples adjacent to a left side of the current block, the vertical mode may be an intra prediction mode in which predicted values of the samples included in the current block are determined to be the same as a value of a sample located in the same column as the samples included in the current block among samples adjacent to an upper side of the current block, the horizontal single mode may be an intra prediction mode in which predicted values of the samples included in the current block are determined to be the same as a value of a sample located at a predetermined position among the samples adjacent to the left side of the current block, and the vertical single mode may be an intra prediction mode in which predicted values of the samples included in the current block are determined to be the same as a value of a sample located at a predetermined position among the samples adjacent to the upper side of the current block.

In one embodiment, an apparatus for encoding a multi-view image includes an encoding-method determiner configured to determine a method of encoding a current block included in a depth image of the multi-view image; an intra skip flag generator configured to generate an intra skip flag, based on the determined encoding method, the intra skip flag indicating whether the current block is encoded according to an intra skip mode; an intra skip prediction mode information generator configured to generate intra skip prediction mode information, based on the determined encoding method, the intra skip prediction mode information indicating an intra prediction mode used to predict the current block among a plurality of intra prediction modes when the current block is encoded according to the intra skip mode; and a coding-information transmitter configured to transmit a bitstream including the intra skip flag and the intra skip prediction mode information. The transmitting of the bitstream comprises transmitting a bitstream excluding residual data of the current block.

A non-transitory computer-readable recording medium having recorded thereon a program for performing the method of decoding a multi-view image and the method of encoding a multi-view image is provided.

Advantageous Effects of the Invention

In an intra skip mode, a large part of coding information of a depth image is skipped. Thus, the efficiency of encoding the depth image may be improved using the intra skip mode.

DESCRIPTION OF THE DRAWINGS

FIG. 6A illustrates a three-dimensional (3D) image extension syntax structure of a sequence parameter set according to an embodiment.

FIG. 6B illustrates a coding-unit syntax structure according to an embodiment.

FIG. 6C illustrates a coding-unit extension syntax structure according to an embodiment.

BEST MODE

Figure 1A:
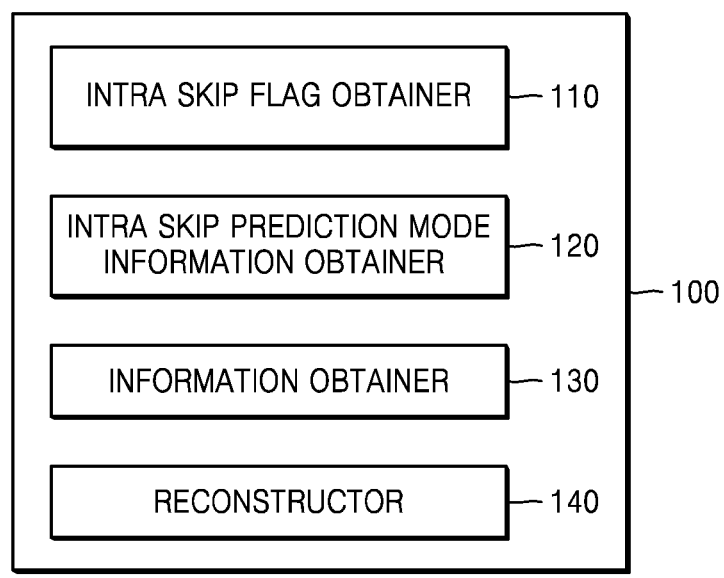
FIG. 1A is a block diagram of a video decoding apparatus according to an embodiment.

In one embodiment, a method of decoding a multi-view image includes obtaining an intra skip flag from a bitstream, the intra skip flag indicating whether a current block included in a depth image of the multi-view image is to be reconstructed based on an intra skip mode; when the intra skip flag indicates that the current block is to be reconstructed based on the intra skip mode, obtaining intra skip prediction mode information from the bitstream, the intra skip prediction mode information indicating an intra prediction mode to be used for the current block among a plurality of intra prediction modes; determining predicted values of samples included in the current block according to an intra prediction method indicated by the intra skip prediction mode information; and reconstructing the current block by determining reconstructed values of the samples, based on the predicted values of the samples.

In one embodiment, a method of encoding a multi-view image includes determining a method of encoding a current block included in a depth image of the multi-view image; generating an intra skip flag indicating whether the current block is encoded according to an intra skip mode, based on the determined encoding method; generating intra skip prediction mode information based on the determined encoding method when the current block is encoded according to the intra skip mode, the intra skip prediction mode information indicating an intra prediction mode used to predict the current block among a plurality of intra prediction modes; and transmitting a bitstream including the intra skip flag and the intra skip prediction mode information. The transmitting of the bitstream may include transmitting a bitstream excluding residual data of the current block.

MODE OF THE INVENTION

Hereinafter, in various embodiments described in the present specification, the term 'image' may collectively refer to not only a still image but also refer to a moving picture such as a video. In addition, the term 'picture' described in the present specification means a still image to be encoded or decoded.

Hereinafter, the term 'sample' refers to data that is assigned to a sampling location of an image and is to be processed. For example, pixels in an image of a spatial domain may be samples.

In the present specification, a technique, a multi-view plus depth (MVD) map, of implementing a 3-dimensional (3D) image by processing depth information about a plurality of views is described. Thus, terms for describing processing of multi-view depth information are described below.

The term 'base-view image' refers to a view image independently encoded/decoded with respect to a different view image.

The term 'dependent-view image' refers to a view image dependently encoded/decoded with respect to a different view image. Thus, the dependent-view image may be encoded dependently to an independent-view image or a different dependent-view image.

The term 'texture picture' or 'texture map' refers to an image including color information of an object with respect to a current view.

The term 'depth picture' or 'depth map' refers to an image including information about a distance from a current view to a surface of an object.

Hereinafter, the term 'skip mode' should be understood as an encoding/decoding method in which a coding unit is encoded/decoded by skipping a large amount of coding information and generating/obtaining only some of the coding information. Thus, when the coding unit is decoded using the skip mode, coding information such as transformation-unit split information and residual information for the coding unit may be skipped.

In one embodiment, in an inter skip mode which is an inter mode to which the skip mode is applied, all coding information needed to perform decoding using the inter mode except merge information may be skipped.

Hereinafter, the term 'intra mode' should be understood as a mode in which an intra prediction method is used and to which the skip mode is not applied. The term 'intra skip mode' should be understood as a mode in which the intra prediction method is used and to which the skip mode is applied. Various embodiments of the intra skip mode will be described in detail with reference to FIGS. 1 to 6 below.

Multi-view image encoding/decoding methods used to implement a 3D image are described below by using the above-described concept.

In order to implement the 3D image, texture images and depth images with respect to a plurality of views are required. For example, when the 3D image is realized based on three views, three texture images and three depth images are necessary. Thus, a great amount of data is required when storing, transmitting, and reproducing the 3D image, compared to a 2D image. Thus, there is a need to develop various encoding methods to reduce the amount of data of the 3D image.

A depth image is invisible to humans similar to a texture image and thus it is difficult for humans to recognize distortion of the depth image. Thus, even if an encoding method having a high distortion rate is applied to the depth image, an encoding method having a high coding rate and a high distortion rate may be applied to the depth image when the quality of a synthetic texture image is maintained constant. The intra skip mode having high coding efficiency and a high distortion rate will be described as an example of an encoding/decoding method applicable to the depth image below.

There may be various embodiments of the intra skip mode according to coding information to be skipped. Thus, the configuration of the intra skip mode is not limited to embodiments to be described below.

Hereinafter, coordinates (x,y) are determined with respect to a sample located at an apex of a top left side of a block.

In more detail, coordinates of the sample located at the apex of the top left side of the block are determined to be (0,0). An x value of the coordinates increases in a right direction, and a y value of the coordinates increases in a lower direction. For example, coordinates of a sample 508 located at an apex of a lower right side of a reference block 500 of FIG. 5A are (7,7).

FIG. 1A is a block diagram of a video decoding apparatus 100, according to an embodiment. In detail, FIG. 1A is a block diagram of a decoding apparatus using the intra skip mode according to an embodiment.

The video decoding apparatus 100 may include an intra skip flag obtainer 110, an intra skip prediction mode information obtainer 120, a predicted-value determiner 130, and a reconstructor 140. Although FIG. 1A illustrates that the intra skip flag obtainer 110, the intra skip prediction mode information obtainer 120, the predicted-value determiner 130, and the reconstructor 140 are separate elements, they may be integrated into the same element in some embodiments. Alternatively, functions of the intra skip flag obtainer 110, the intra skip prediction mode information obtainer 120, the predicted-value determiner 130, and the reconstructor 140 may be performed by two or more elements in some elements. For example, the functions of the intra skip flag obtainer 110 and the intra skip prediction mode information obtainer 120 may be performed by a coding-information obtainer, and the functions of the predicted-value determiner 130 and the reconstructor 140 may be performed by a decoder.

Although FIG. 1A illustrates that the intra skip flag obtainer 110, the intra skip prediction mode information obtainer 120, the predicted-value determiner 130, and the reconstructor 140 are elements included in one device, devices performing the functions of the intra skip flag obtainer 110, the intra skip prediction mode information obtainer 120, the predicted-value determiner 130, and the reconstructor 140 need not be physically adjacent to one another. Thus, in one embodiment, the intra skip flag obtainer 110, the intra skip prediction mode information obtainer 120, the predicted-value determiner 130, and the reconstructor 140 may be dispersed.

In one embodiment, the intra skip flag obtainer 110, the intra skip prediction mode information obtainer 120, the predicted-value determiner 130, and the reconstructor 140 of FIG. 1A may be embodied as one processor. In one embodiment, they may be embodied as a plurality of processors.

The video decoding apparatus 100 may include a storage unit (not shown) for storing data generated by the intra skip flag obtainer 110, the intra skip prediction mode information obtainer 120, the predicted-value determiner 130, and the reconstructor 140. The intra skip flag obtainer 110, the intra skip prediction mode information obtainer 120, the predicted-value determiner 130, and the reconstructor 140 may extract data from the storage unit and use the data.

The video decoding apparatus 100 of FIG. 1A is not limited to a physical apparatus. For example, some of functions of the video decoding apparatus 100 may be implemented as software rather than hardware.

The intra skip flag obtainer 110 obtains an intra skip flag for a current block from a bitstream.

The current block means a block to be currently decoded. The current block may be a tetragonal coding unit or prediction unit.

The intra skip flag is a flag indicating whether the current block is to be predicted based on the intra skip mode. The intra skip flag may be obtained only when the current block is included in a depth image. In one embodiment, the intra skip flag may represent '0' or '1'. When the intra skip flag represents '0', the intra skip mode is not applied to the current block. In contrast, when the intra skip flag represents '1', the intra skip mode is applied to the current block. When the intra skip flag is not included in the bitstream, the intra skip flag obtainer 110 determines the intra skip flag to be '0'. Thus, when the intra skip flag is not included in the bitstream, the intra skip mode is not applied to the current block.

The intra skip flag obtainer 110 may obtain the intra skip flag when an intra skip enabled flag corresponding to the current block indicates that the intra skip mode is applicable to the current block. The intra skip enabled flag indicates whether the intra skip mode is applicable to the current block. Thus, after the intra skip enabled flag corresponding to the current block is obtained, the intra skip flag for each of blocks is obtained when the intra skip enabled flag indicates that the intra skip mode is applicable to the blocks.

An intra skip enabled flag obtainer (not shown) may obtain the intra skip enabled flag from the bitstream. The intra skip enabled flag may be included in a header of a slice segment included in the current block, a picture parameter set of the depth image which is an upper element of the slice segment, a sequence parameter set including sequences which is an upper element of the depth image, or a video parameter set for all videos which is an upper element of a sequence. For example, when the intra skip enabled flag is defined in units of sequences, the intra skip enabled flag obtainer obtains the intra skip enabled flag included in the sequence parameter set from the bitstream.

The intra skip enabled flag is applicable to all blocks included in an element corresponding to the intra skip enabled flag. For example, the intra skip enabled flag included in the sequence parameter set is applicable to all blocks included in a sequence defined using the sequence parameter set.

The intra skip enabled flag may indicate '0' or T. When the intra skip enabled flag indicates '0', the intra skip flag is not obtained with respect to all blocks to which the intra skip enabled flag is applied. When the intra skip enabled flag indicates '1', the intra skip flag is obtained with respect to all blocks to which the intra skip enabled flag is applied. When the intra skip enabled flag is not included in the bitstream, the intra skip enabled flag obtainer may determine the intra skip enabled flag to be '0'. Thus, when the intra skip enabled flag is not included in the bitstream, the intra skip flag is not obtained with respect to all blocks to which the intra skip enabled flag is applied.

In one embodiment, when it is determined that the inter skip mode is not applied to the current block, the intra skip flag obtainer 110 may obtain the intra skip flag. Thus, the intra skip flag may be obtained after the inter skip flag indicating whether the inter skip mode is applied or not is obtained. In one embodiment, first, the intra skip flag may be obtained and then the inter skip flag may be obtained when it is determined that the intra skip mode is not applied to the current block according to the intra skip flag.

When it is determined that the current block is to be decoded according to the intra skip mode, the intra skip prediction mode information obtainer 120 obtains intra skip prediction mode information regarding the current block from the bitstream.

The intra prediction mode should be understood as a prediction method in which predicted values of samples included in a coding unit or a prediction unit are determined using samples neighboring to the coding unit or the prediction unit. Examples of the intra prediction mode include a DC mode, a planar mode, a directionality prediction mode such as a vertical mode, an intra-contour mode, a wedge mode, a single mode, etc.

The vertical mode, a horizontal mode, a vertical single mode, and a horizontal single mode among intra prediction modes will be described in detail with reference to FIGS. 3A to 4B below.

The intra skip prediction mode information indicates an intra prediction mode to be used for the current block when the current block is decoded according to the intra skip mode. The intra skip prediction mode information may indicate an intra prediction mode among intra prediction mode candidates.

In one embodiment, the intra skip prediction mode information may indicate the vertical mode or the horizontal mode which is an intra prediction mode. In another embodiment, the intra skip prediction mode information may indicate the vertical mode, the horizontal mode, the vertical single mode, or the horizontal single mode which is an intra prediction mode. In another embodiment, the intra skip prediction mode information may indicate am intra prediction mode among intra prediction modes used in an intra mode.

In one embodiment, a value which is in a range of 0 to N−1 may be allocated to the intra skip prediction mode information. Here, 'N' represents the number of intra prediction mode candidates. When the number of intra prediction mode candidates is '4', a value which is in a range of 0 to 3 may be allocated to the intra skip prediction mode information.

In detail, in one embodiment, when the intra skip prediction mode information indicates the vertical mode or the horizontal mode which is an intra prediction mode, '0' or '1' is allocated to the intra skip prediction mode information. In the embodiment, when the intra skip prediction mode information indicates '0', the vertical mode may be used as an intra prediction mode of the current block. In contrast, when the intra skip prediction mode information indicates '1', the horizontal mode may be used as an intra prediction mode of the current block.

In another embodiment, when the intra skip prediction mode information indicates an intra prediction mode among the vertical mode, the horizontal mode, the vertical single mode, and the horizontal single mode, a value which is in a range of 0 to 3 is allocated to the intra skip prediction mode information. In the embodiment, the vertical mode may be used as an intra prediction mode of the current block when the intra skip prediction mode information is '0', the horizontal mode may be used as an intra prediction mode of the current block when the intra skip prediction mode information is '1', the vertical single mode may be used as an intra prediction mode of the current block when the intra skip prediction mode information is '2', and the horizontal single mode may be used as an intra prediction mode of the current block when the intra skip prediction mode information is '3'.

In another embodiment, when the intra skip prediction mode information indicates one of all intra prediction modes used in the intra mode, the intra skip prediction mode information may indicate an intra prediction mode to be used in the current block according to a method which is substantially the same as a method of determining an intra prediction mode to be used in the intra mode. For example, when in the intra mode, a most probable mode (MPM) among a plurality of intra prediction modes is determined and an intra prediction mode is determined in consideration of the MPM, an MPM among a plurality of intra prediction modes may be determined and an intra skip prediction mode may be determined in consideration of the MPM in the intra skip mode.

As the number of intra prediction mode candidates available in the intra skip mode is increased, the amount of bits to be allocated to the intra skip prediction mode information is increased. For example, when the intra prediction mode candidates include the vertical mode, the horizontal mode, the vertical single mode, and the horizontal single mode, the number of the intra prediction mode candidates is '4'. Thus, the intra skip prediction mode information may be expressed with two bits when fixed length coding is used, and may be expressed with one to three bits when unary coding is used. As another example, if the intra prediction mode candidates include 32 intra prediction modes, the intra skip prediction mode information may be expressed with five bits when fixed length coding is used. Thus, when an excessive number of intra modes are included in the intra prediction mode candidates, the efficiency of the intra skip mode may decrease.

However, as the number of intra prediction mode candidates is increased, the applicability of the intra skip mode is increased. For example, when the intra prediction mode candidates include only the vertical mode and the horizontal mode, the intra skip mode may be applied to only cases in which the current block is predictable according to the vertical mode or the horizontal mode. However, when intra prediction mode candidates include the vertical mode, the horizontal mode, the vertical single mode, and the horizontal single mode, the intra skip mode is also applicable when the current block is predictable according to the vertical single mode, and the horizontal single mode.

Thus, intra prediction mode candidates available in the intra skip mode may be determined according to an appropriate number of intra prediction mode candidates and the applicability thereof in the intra skip mode.

When the intra skip flag indicates that the current block may be predicted according to the intra skip mode, the intra skip prediction mode information obtainer 120 may obtain the intra skip prediction mode information from the bitstream. Thus, when the intra skip flag indicates that the current block is not predicted according to the intra skip mode, the intra skip prediction mode information obtainer 120 does not obtain the intra skip prediction mode information.

In one embodiment, when the intra skip flag indicates that the current block is not predicted according to the intra skip mode, information regarding a method of predicting the current block may be obtained after the intra skip flag. For example, information indicating whether the current block is reconstructed according to the intra mode or the inter mode may be obtained.

The predicted-value determiner 130 determines predicted values of samples included in the current block according to an intra prediction mode indicated by the intra skip prediction mode information.

In the intra skip mode, coding information except the intra skip prediction mode information is not obtained. Thus, the current block is predicted according to the intra prediction mode indicated using the intra skip prediction mode information.

The reconstructor 140 reconstructs the current block by determining reconstructed values of the samples, based on the predicted values of the samples.

In the intra mode, predicted values of samples included in the current block are determined and reconstructed values of the samples are determined using the predicted values of the samples and residual data. However, in the intra skip mode, the residual data is skipped and thus the predicted values of the samples are the same as reconstructed values thereof.

In one embodiment, the reconstructor 140 may determine the reconstructed values of the samples by filtering the predicted values of the samples. For example, the reconstructor 140 may determine the reconstructed values of the samples by applying an in-loop filter, such as a de-blocking filter and a sample adaptive offset, to the predicted values of the sample. Thus, the predicted values of the samples may be different from the reconstructed values thereof in some embodiments.

Figure 1B:
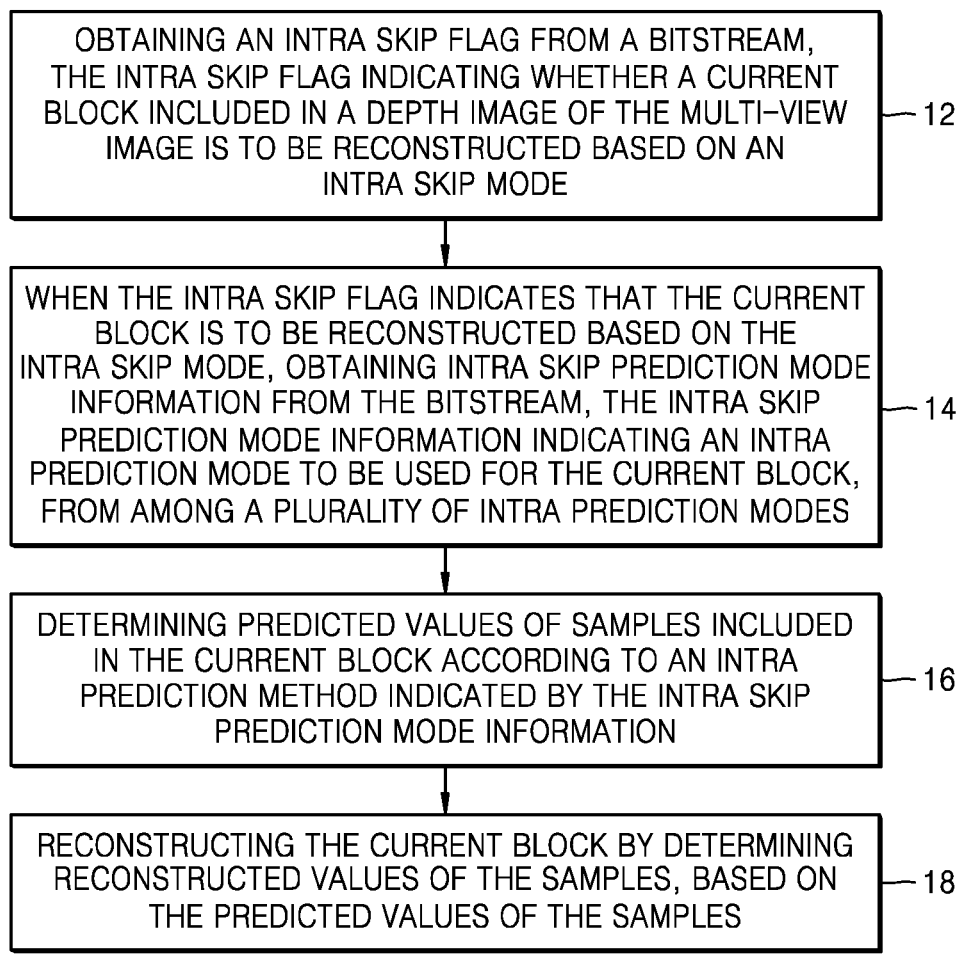
FIG. 1B is a flowchart of a video decoding method according to an embodiment.

FIG. 1B is a flowchart of a video decoding method 10 according to an embodiment. In detail, FIG. 1B is a flowchart of a decoding method performed according to the intra skip mode, according to an embodiment.

In operation S12, an intra skip flag corresponding to a current block is obtained from a bitstream. The current block is included in a depth image of a multi-view image. The intra skip flag indicates whether the current block is to be predicted based on the intra skip mode. The intra skip flag may be obtained only when the current block is included in the depth image.

In one embodiment, when an intra skip enabled flag corresponding to the current block indicates that the intra skip mode is to be applied to the current block, the intra skip flag may be obtained.

In one embodiment, when it is determined that the intra skip mode is not to be applied to the current block, the intra skip flag may be obtained.

In operation S14, intra skip prediction mode information for the current block is obtained from the bitstream. The intra skip prediction mode information indicates an intra prediction mode to be used for the current block among a plurality of intra prediction modes available in the intra skip mode.

In one embodiment, when the intra skip flag indicates that the current block is to be reconstructed according to the intra skip mode, the intra skip prediction mode information for the current block may be obtained from the bitstream.

In operation S16, predicted values of samples included in the current block are determined according to an intra prediction method indicated by the intra skip prediction mode information.

In operation S18, the current block is reconstructed by determining reconstructed values of the samples, based on the predicted values of the samples.

The above-described video decoding method 10 according to an embodiment may be performed by the video decoding apparatus 100.

Figure 2A:
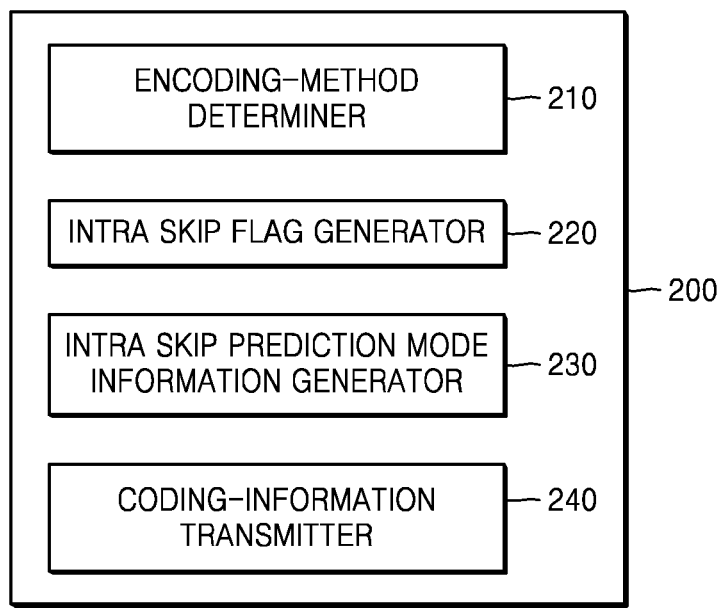
FIG. 2A is a block diagram of a video encoding apparatus according to an embodiment.

FIG. 2A is a block diagram of a video encoding apparatus 200 according to an embodiment. In detail, FIG. 2A is a block diagram of an encoding apparatus using the intra skip mode according to an embodiment.

The video encoding apparatus 200 may include an encoding-method determiner 210, an intra skip flag generator 220, an intra skip prediction mode information generator 230, and a coding-information transmitter 240. Although FIG. 2A illustrates that the encoding-method determiner 210, the intra skip flag generator 220, the intra skip prediction mode information generator 230, and the coding-information transmitter 240 as separate elements, they may be integrated into the same element in one embodiment. In one embodiment, functions of the intra skip flag generator 220 and the intra skip prediction mode information generator 230 may be performed by a coding-information generator (not shown).

Although FIG. 2A illustrates that the encoding-method determiner 210, the intra skip flag generator 220, the intra skip prediction mode information generator 230, and the coding-information transmitter 240 are elements included in one device, devices performing functions of the encoding-method determiner 210, the intra skip flag generator 220, the intra skip prediction mode information generator 230, and the coding-information transmitter 240 need not be physically adjacent to one another. Thus, in one embodiment, the encoding-method determiner 210, the intra skip flag generator 220, the intra skip prediction mode information generator 230, and the coding-information transmitter 240 may be dispersed.

In one embodiment, the encoding-method determiner 210, the intra skip flag generator 220, the intra skip prediction mode information generator 230, and the coding-information transmitter 240 of FIG. 2A may be embodied as one processor. Alternatively, in one embodiment, they may be embodied as a plurality of processors.

The video encoding apparatus 200 may include a storage unit (not shown) for storing data generated by the encoding-method determiner 210, the intra skip flag generator 220, the intra skip prediction mode information generator 230, and the coding-information transmitter 240. Furthermore, the encoding-method determiner 210, the intra skip flag generator 220, the intra skip prediction mode information generator 230, and the coding-information transmitter 240 may extract data stored in the storage unit and use the data.

The video encoding apparatus 200 of FIG. 2A is not limited to a physical device. For example, some of functions of the video encoding apparatus 200 may be embodied as software other than hardware.

The encoding-method determiner 210 determines a method of encoding a current block included in a depth image of a multi-view image. The encoding-method determiner 210 according to one embodiment determines an encoding mode used to encode the current block among the intra mode, the inter mode, the intra skip mode, and the inter skip mode. Furthermore, when the current block is encoded according to the intra skip mode, the encoding-method determiner 210 according to one embodiment determines an intra prediction mode used to predict the current block among a plurality of intra prediction modes available in the intra skip mode.

After the intra prediction mode is determined, the encoding-method determiner 210 according to one embodiment may determine an encoding mode used to encode the current block among the intra skip mode and the intra mode.

The encoding-method determiner 210 may determine an encoding mode and an intra prediction mode most appropriate for the current block through rate-distortion optimization. Thus, the encoding-method determiner 210 determines the intra skip mode to be an encoding mode of the current block when a rate-distortion cost is low as a result of encoding the current block according to the intra skip mode. Similarly, the encoding-method determiner 210 may determine an intra prediction mode having a low rate-distortion cost to be an intra prediction mode of the current block.

The intra skip flag generator 220 generates an intra skip flag indicating whether the current block is encoded according to the intra skip mode, based on the encoding method determined by the encoding-method determiner 210. In one embodiment, the intra skip flag generator 220 may determine the intra skip flag to be '1' when the current block is encoded according to the intra skip mode. In contrast, in one embodiment, the intra skip flag generator 220 may determine the intra skip flag to be '0' when the current block is not encoded according to the intra skip mode.

In one embodiment, the intra skip flag generator 220 may generate the intra skip flag according to the intra skip enabled flag corresponding to the current block. When it is determined that the intra skip mode is not permitted for the current block according to the intra skip enabled flag, the intra skip flag generator 220 does not generate the intra skip flag for the current block. In contrast, when it is determined that the intra skip mode is permitted for the current block according to the intra skip enabled flag, the intra skip flag generator 220 generates the intra skip flag for the current block.

In one embodiment, the intra skip enabled flag may be defined with respect to a slice segment, the depth image, a sequence unit, or all video levels. For example, when the intra skip enabled flag is defined with respect to the sequence unit, the intra skip enabled flag may be applied to all blocks included in the sequence unit.

In one embodiment, the intra skip flag generator 220 may generate the intra skip flag when the encoding mode of the current block is not the inter skip mode. The video encoding apparatus 200 may first determine the inter skip flag for determining whether the encoding mode of the current block is the inter skip mode or not. When the inter skip flag indicates that the current block is encoded according to the inter skip mode, the intra skip flag generator 220 may skip generation of the intra skip flag. When the inter skip flag indicates that the current block is not encoded according to the inter skip mode, the intra skip flag generator 220 may generate the intra skip flag.

In another embodiment, the intra skip flag generator 220 may generate the intra skip flag regardless of whether the encoding mode of the current block is the inter skip mode or not. The video encoding apparatus 200 may be configured to generate the inter skip flag when the encoding mode of the current block is not the intra skip mode.

The intra skip prediction mode information generator 230 generates intra skip prediction mode information indicating an intra prediction mode used to predict the current block, based on the encoding method generated by the encoding-method determiner 210.

In one embodiment, the intra skip prediction mode information generator 230 generates the intra skip prediction mode information when the current block is encoded according to the intra skip mode. Thus, when the current block is encoded according to a mode other than the intra skip mode, the intra skip prediction mode information generator 230 does not generate the intra skip prediction mode information.

In one embodiment, the intra skip prediction mode information is determined to indicate the intra prediction mode used to predict the current block among a plurality of intra prediction modes available in the intra skip mode.

In one embodiment, when intra prediction modes available in the intra skip mode are the vertical mode, the horizontal mode, the vertical single mode, and the horizontal single mode, a value which is in a range of 0 to 3 may be allocated to the intra skip prediction mode information. For example, when '0' is allocated to the vertical mode, the intra skip prediction mode information generator 230 may determine the intra skip prediction mode information to be '0' when the vertical mode is used to predict the current block.

The intra skip prediction mode information generator 230 may indicate the intra prediction mode according to a different method according to the types and number of intra prediction modes available in the intra skip mode.

The coding-information transmitter 240 transmits a bitstream including the intra skip flag and the intra skip prediction mode information.

In the intra skip mode, a large amount of coding information generated in the intra mode is skipped. Thus, the bitstream transmitted in the intra skip mode by the coding-information transmitter 240 does not include residual data indicating the difference between the current block and a predicted block. However, in some embodiments, the coding-information transmitter 240 may additionally include coding information into the bitstream, in addition to the intra skip flag and the intra skip prediction mode information.

Figure 2B:
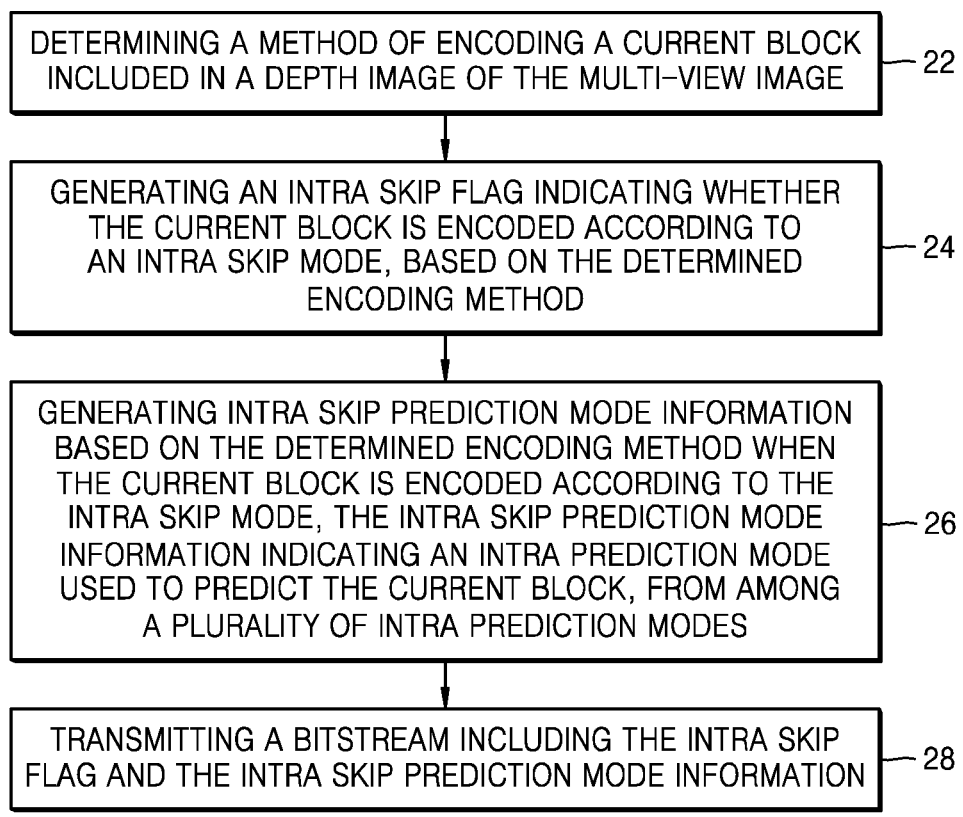
FIG. 2B is a flowchart of a video encoding method according to an embodiment.

FIG. 2B is a flowchart of a video encoding method 10 according to an embodiment. In detail, FIG. 2B is a flowchart of an encoding method based on the intra skip mode according to an embodiment.

In operation S22, a method of encoding a current block included in a depth image of a multi-view image is determined. In one embodiment, an encoding mode and a prediction mode used to encode the current block are determined. Operation S22 may be performed using rate-distortion optimization. If it is most efficient in terms of rate-distortion optimization when the current block is encoded according to the intra skip mode, the intra skip mode is determined to be the method of encoding the current block.

In operation S24, an intra skip flag indicating whether the current block is encoded using the intra skip mode is generated. In one embodiment, the intra skip flag may be generated according to an intra skip enabled flag corresponding to the current block. In one embodiment, the intra skip flag may be generated when the current block is not encoded according to the inter skip mode.

In operation S26, when the current block is encoded according to the intra skip mode, intra skip prediction mode information indicating an intra prediction mode used to predict the current block among a plurality of intra prediction mode is generated.

In operation S28, a bitstream including the intra skip flag and the intra skip prediction mode information is transmitted. Residual data indicating the difference between the current block and a predicted block is not included into the bitstream.

The above-described video encoding method 20 according to an embodiment may be performed by the video encoding apparatus 200.

Prediction methods performed in the horizontal mode, the vertical mode, the horizontal single mode, and the vertical single mode will be described with respect to FIGS. 3A to 4B below.

In the horizontal mode, a predicted value of a sample included in a current block is determined to be the same as a value of a sample located in the same row as the sample included in the current block among samples adjacent to a left side of the current block. Thus, all values of samples included in the current block in the same row are the same. Application of prediction performed according to the horizontal mode will be described in detail with reference to FIG. 3A below.

Figure 3A:
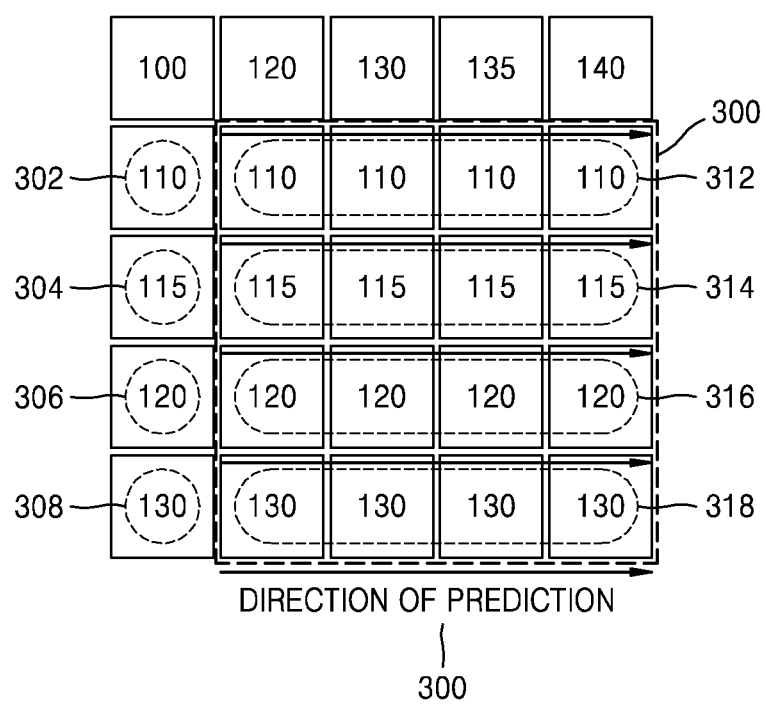
FIG. 3A is a diagram illustrating a horizontal-mode prediction method according to an embodiment.

In FIG. 3A, a current block 300 is a 4×4 block. The current block 300 includes four rows 312, 314, 316, and 318. Samples 302, 304, 306, and 308 are located adjacent to a left side of the current block 300. Predicted values of samples in the first row 312 which is an uppermost row of the current block 300 are determined to be the same as a value of the sample 302 located in the first row 312 and adjacent to the left side of the current block 300. Similarly, predicted values of samples in the second row 314 of the current block 300 are determined to be the same as a value of the sample 304 located in the second row 314 and adjacent to the left side of the current block 300.

In the vertical mode, a predicted value of a sample included in a current block is determined to be the same as a value of a sample located in the same column as the sample included in the current block among samples adjacent to an upper side of the current block. Thus, predicted values of samples of the current block in the same column are the same. Application of prediction performed according to the horizontal mode will be described in detail with reference to FIG. 3B below.

Figure 3B:
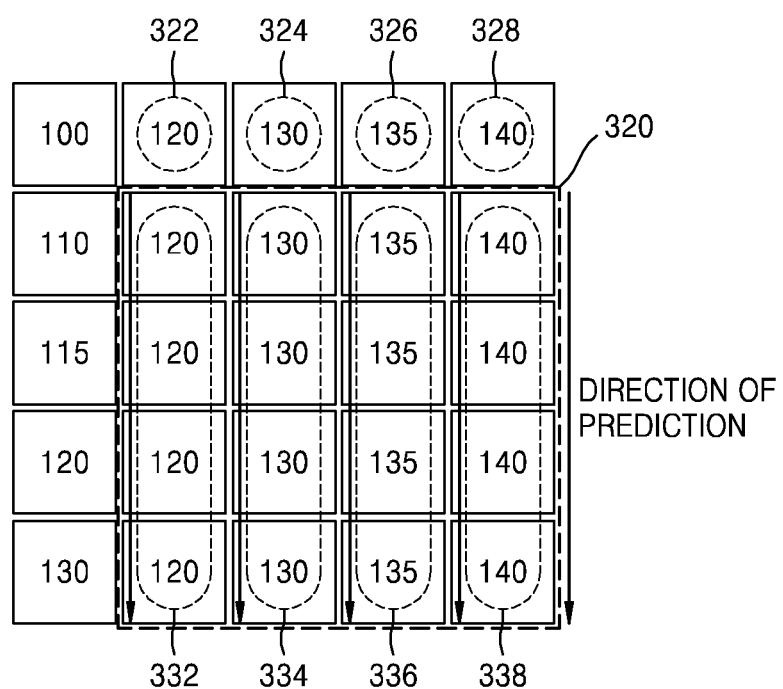
FIG. 3B is a diagram illustrating a vertical-mode prediction method according to an embodiment.

In FIG. 3B, a current block 320 is a 4×4 block. The current block 320 includes four columns 332, 334, 336, and 338. Samples 322, 324, 326, and 328 are adjacent to an upper side of the current block 320. Predicted values of samples in the first column 332 which is a leftmost column of the current block 320 are determined to be the same as a value of the sample 322 located in the first column 332 and adjacent to the upper side of the current block 320. Similarly, predicted values of samples in the second column 334 are determined to be the same as a value of the sample 324 located in the second column 334 and adjacent to the upper side of the current block 320.

The single mode should be understood as an intra prediction mode in which only a sample located at a predetermined position among samples adjacent to a current block is determined to be a reference sample and a value of the reference sample is determined to be predicted values of samples included in the current block. The single mode may be classified into various types of modes according to the type of neighboring samples.

In the horizontal single mode, predicted values of samples included in a current block are determined to be the same as a value of a sample located at a predetermined position among samples adjacent to a left side of the current block. Thus, predicted values of all the samples included in the current block are the same. Application of prediction performed according to the horizontal single mode will be described in detail with reference to FIG. 4A below.

Figure 4A:
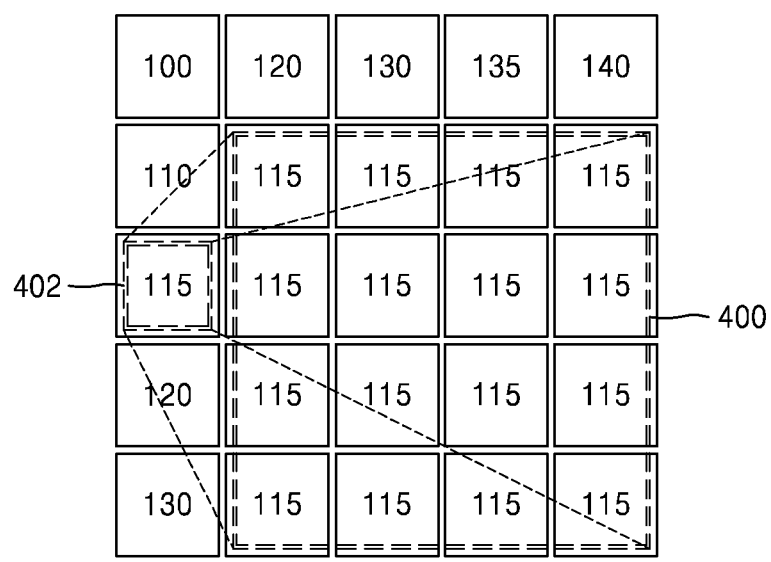
FIG. 4A is a diagram illustrating a horizontal single mode prediction method according to an embodiment.

In FIG. 4A, a current block 400 is a 4×4 block. Predicted values of samples included in the current block 400 are determined using a reference sample 402 on a second line from the top of the current block in a downward direction among samples adjacent to a left side of the current block 400. For example, when the reference sample 402 has a value of 115, all of predicted values of the samples included in the current block 400 are determined to be '115'.

In the vertical single mode, predicted values of samples included in a current block are determined to be the same as a value of a sample located at a predetermined position among samples adjacent to an upper side of the current block. Thus, predicted values of all the samples included in the current block are the same. Application of prediction performed in the vertical single mode will be described in detail with reference to FIG. 4B below.

Figure 4B:
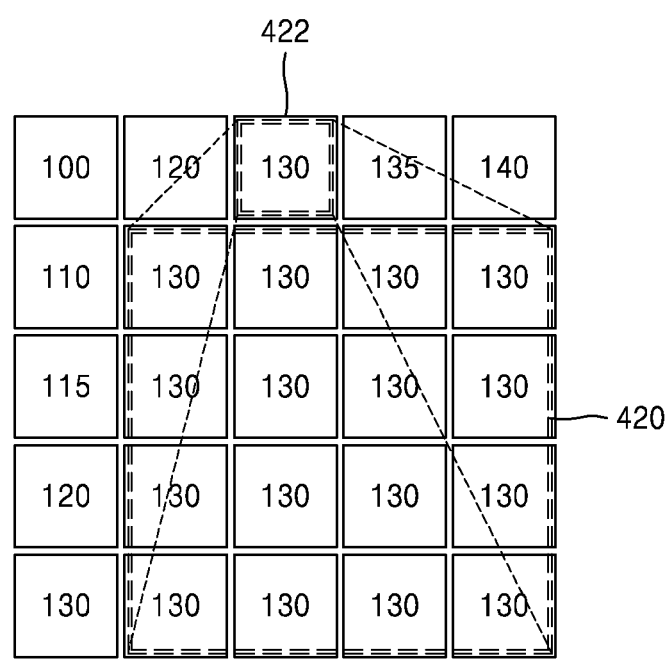
FIG. 4B is a diagram illustrating a vertical single mode prediction method according to an embodiment.

In FIG. 4B, a current block 420 is a 4×4 block. Predicted values of samples included in the current block 420 are determined using a reference sample 422 which is a second sample from a left side of the current block 420 among samples adjacent to an upper side of the current block 420. For example, when the reference sample 422 has a value of 130, the predicted values of all the samples included in the current block 420 are determined to be '130'.

The positions of the reference samples described above with reference to FIGS. 4A and 4B are not fixed and a neighboring sample at another position may be used as a reference sample in some embodiments.

Figure 5:
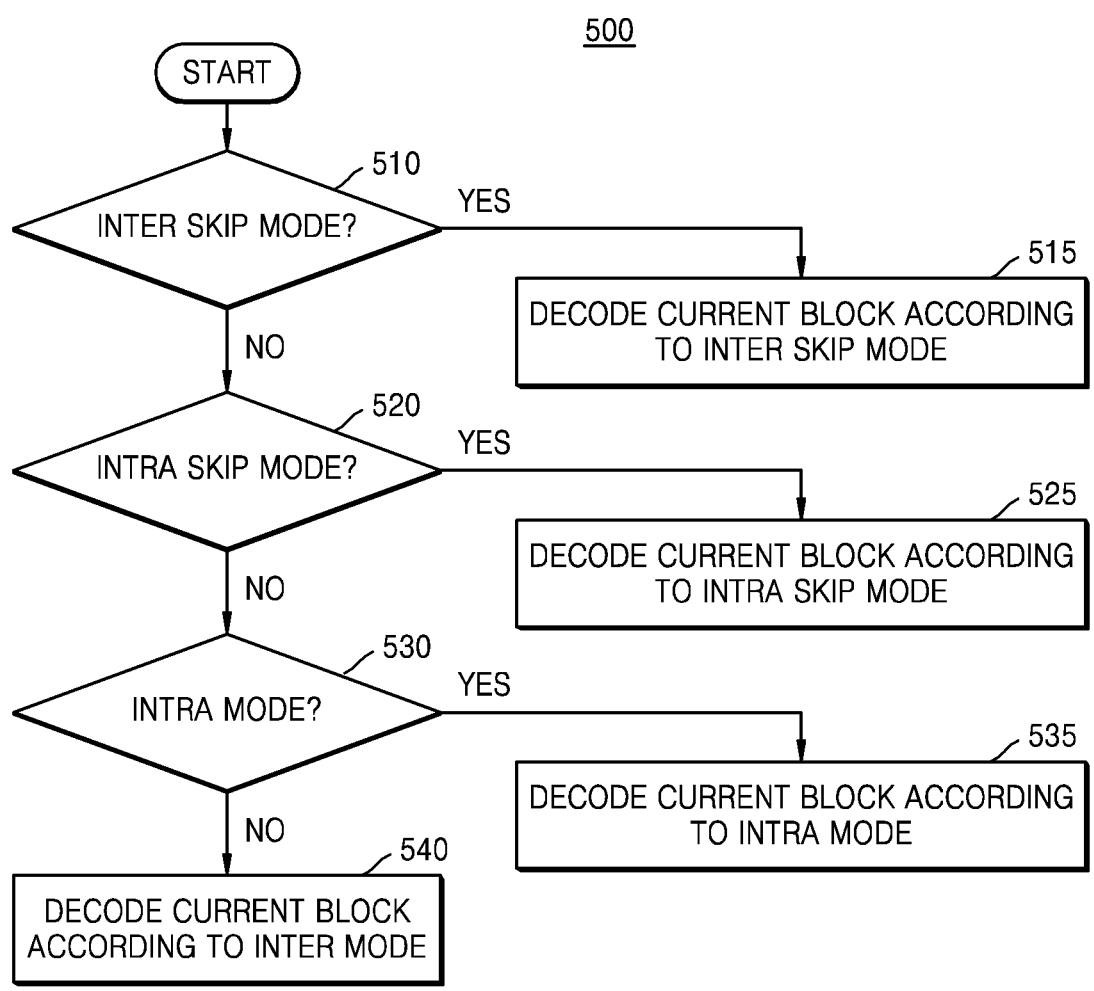
FIG. 5 is a block diagram of a video decoding apparatus according to another embodiment.

FIG. 5 is a flowchart of a video decoding method 500 to which the intra skip mode is applied, according to another embodiment.

In the video decoding method 500 to which the intra skip mode is applied, it is sequentially checked whether an encoding mode of a current block is the inter skip mode, the intra skip mode, or the intra mode. In detail, a flag is obtained from a bitstream to determine whether the encoding mode of the current block is the inter skip mode, the intra skip mode, or the intra mode.

The skip mode is an encoding mode in which transmission of coding information is skipped to maximize a compression ratio. Thus, first, whether the current block is to be decoded according to the skip mode is checked to skip a flag indicating whether the encoding mode is the intra mode or not. Then, when the encoding mode is not the skip mode, whether the intra mode or the inter mode is to be applied to the current block is checked. The skip mode includes the intra skip mode and the inter skip mode. First, whether the intra skip mode or the inter skip mode with a high frequency of application is to be applied may be checked.

In operation S510, whether the current block is to be decoded according to the inter skip mode is determined. When it is determined that the current block is to be decoded according to the inter skip mode, operation S515 is performed. When it is determined that the current block is not to be constructed according to the inter skip mode, operation S520 is performed.

In operation S515, the current block is decoded according to the inter skip mode. In one embodiment, in the inter skip mode, all coding information except a merge index is skipped. Thus, the current block is predicted using coding information of a block candidate indicated by the merge index among block candidates including spatially neighboring blocks and temporally neighboring blocks. Since residual data is not obtained, a block obtained by in-loop filtering a predicted block of the current block is determined as a reconstructed block of the current block.

In operation S520, it is checked whether the current block is to be decoded according to the intra skip mode. When it is determined that the current block is to be decoded according to the intra skip mode, operation S525 is performed. When it is determined that the current block is not to be decoded according to the intra skip mode, operation S530 is performed.

In operation S525, the current block is decoded according to the intra skip mode. In one embodiment, in the intra skip mode, all coding information except intra skip prediction mode information is skipped. Thus, the current block is predicted according to the inter prediction mode indicated by the intra skip prediction mode information. As in the inter skip mode, residual data is not obtained and thus a block obtained by in-loop filtering a predicted block of the current block is determined to be a decoded block of the current block.

In operation S530, it is checked whether the current block is to be decoded according to the intra mode. When it is determined that the current block is to be decoded according to the intra mode, operation S535 is performed. When it is determined that the current block is not to be constructed according to the intra mode, operation S540 is performed.

In operation S535, the current block is decoded according to the intra mode. In one embodiment, in the intra mode, partition information, intra prediction mode information, and residual data are obtained to predict the current block.

The current block is divided into one or more sub-blocks according to the partition information. Then an intra prediction mode to be applied to each of the sub-blocks is determined according to the intra prediction mode information.

The intra prediction mode information may include a most probable mode (MPM) flag indicating whether the current block is to be predicted according to an intra prediction mode corresponding to an MPM. The intra prediction mode information may further include MPM information indicating an MPM number of the intra prediction mode when the current block is to be predicted according to the intra prediction mode corresponding to the MPM. When the current block is not to be predicted according to the intra prediction mode corresponding to the MPM, intra prediction mode information indicating an intra prediction mode to be used for the current block among intra prediction modes except the MPM may be included.

Each of the sub-blocks is predicted according to the intra prediction mode. A reconstructed block of each of the sub-blocks is determined using a predicted block of the sub-block and the residual data.

In operation S540, the current block is decoded according to the inter mode. In one embodiment, in the inter mode, partition information, a merge flag, and residual data are obtained to predict the current block. The current block is divided into one or more sub-blocks according to the partition information. Then it is determined whether a merge mode is to be applied to each of the sub-blocks according to the merge flag.

When the merge mode is to be applied, a merge index may be additionally obtained. A predicted block of each of the sub-blocks may be determined according to coding information of a candidate block indicated by the merge index. Then a reconstructed block of each of the sub-blocks may be determined using the predicted block and the residual data.

When the merge mode is not to be applied, first motion candidate information, first motion difference information, second motion candidate information, and second motion difference information may be obtained. Based on the obtained information, at least one of a first reference block and a second reference block may be obtained. A predicted block of each of the sub-blocks may be determined based on at least one of the first reference block and the second reference block. Then a reconstructed block of each of the sub-blocks may be determined using the predicted block and the residual data.

The video decoding method 500 of FIG. 5 is merely one of various embodiments, and the inter skip mode, the intra skip mode, the inter mode, and the intra mode described above may be embodied differently.

FIGS. 6A to 6C illustrate embodiments of a syntax structure for the intra skip mode.

FIG. 6A illustrates a 3D image extension syntax structure 600 of a sequence parameter set (hereinafter referred to as an 'SPS extension syntax structure) according to an embodiment. The SPS extension syntax structure 600 includes syntax elements to be commonly applied to a sequence unit of multi-view video.

In the SPS extension syntax structure 600 according to an embodiment, 'd' represents an index for differentiating a texture image and a depth image from each other. When 'd' is '0', information regarding the texture image is obtained. When 'd' is '1', information regarding the depth image is obtained.

In the SPS extension syntax structure 600 according to an embodiment, a skip_intra_enabled_flag [d] is included. The skip_intra_enabled_flag [d] means an intra skip enabled flag. When 'd' is '1', skip_intra_enabled_flag [1] is obtained (with respect to a depth image). The skip_intra_enabled_flag [1] may be '0' or T. When the skip_intra_enabled_flag [1] is '0', an intra skip flag is not obtained with respect to all blocks (coding units) included in a sequence unit. When the skip_intra_enabled_flag [1] is '1', an intra skip flag is obtained with respect to all the blocks (coding units) included in the sequence unit.

In the SPS extension syntax structure 600 according to an embodiment, when 'd' is '0' (with respect to a texture image), a skip_intra_enabled_flag [0] is not obtained from a bitstream. Thus, the skip_intra_enabled_flag [0] is fixed to '0'. Accordingly, the intra skip mode is not applied to the texture image.

In FIG. 6A, the skip_intra_enabled_flag [d] is an embodiment of the intra skip enabled flag and the intra skip enabled flag may be thus expressed differently.

FIG. 6B illustrates a coding-unit syntax structure 610 according to an embodiment. The coding-unit syntax structure 610 includes syntax elements obtained with respect to a coding unit. The coding-unit syntax structure 610 includes an intra skip flag which is a syntax element. In the coding-unit syntax structure 610 according to an embodiment, skip_intra_flag[x0][y0] is included as an intra skip flag. According to the skip_intra_flag[x0][y0], obtained syntax elements may be skipped in the coding-unit syntax structure 610.

In the coding-unit syntax structure 610 according to an embodiment,
if(slice_type!=I)

cu_skip_flag[x0][y0]     (Syntax 1)

Syntax 1 represents that when a slice type of a depth image to which a current block belongs is not intra (I), a cu_skip_flag[x0][y0] which means an inter skip flag is obtained.
    elseif (SkipintraEnabledFlag)

skip_intra_flag[x0][y0]     (Syntax 2)

Syntax 2 represents that skip_intra_flag[x0][y0] which means the intra skip flag is obtained when the current block is determined not to be reconstructed according to the inter skip mode and the obtained intra skip enabled flag of FIG. 6A indicates that the intra skip mode is permitted for the current block.

```
if( !cu_skip_flag[x0][y0] && ! skip_intra_flag[x0][y0]) {
... (syntax element for intra mode & inter mode)
}                                                         (Syntax
                                                               3)
```

Syntax 3 represents that the current block is reconstructed according to the inter mode or the intra mode when the current block is not reconstructed according to the inter skip mode or the intra skip mode. Thus, when the current block is reconstructed according to the intra skip mode, all syntax elements needed to reconstruct the current block according to the inter mode or the intra mode are skipped.

Cu_extension(x0,y0,log 2CbSize)     (Syntax 4)

Syntax 4 is Cu_extension(x0, y0, log 2CbSize) which is a command to call a coding-unit extension syntax structure for the intra skip mode. The coding-unit extension syntax structure will be described with reference to FIG. 6C below.

```
    if( DcOnlyFlag[x0][y0]||
        (!skip_intra_flag[x0][y0] && CuPredMode[x0][y0] = = MODE_INTRA))
        depth_dcs(x0, y0, log2CbSize)
        if(!cu_skip_flag[x0][y0] && !skip_intra_flag[x0][y0] && !dc_only_flag[x0][y0]
&& !pcm_flag[x0][y0] ) {
        ......
        transform_tree(x0, y0, x0, y0, log2CbSize, 0, 0)
    }                                                                    (Syntax 5)
```

Syntax 5 includes a command to call a syntax structure for obtaining residual data and a condition for executing a residual command. depth_dcs(x0, y0, log 2CbSize) and transform_tree(x0, y0, x0, y0, log 2CbSize, 0, 0) are commands to call a syntax structure for obtaining residual data. !skip_intra_flag[x0][y0] is one of conditions for calling these commands. !skip_intra_flag[x0][y0] means that the intra skip flag is '0'. Thus, when the current block is reconstructed according to the intra skip mode (when the intra skip flag is '1'), residual data is not obtained.

In FIG. 6B, skip_intra_flag[x0][y0] is one embodiment of the intra skip flag and thus the intra skip flag may be expressed differently.

FIG. 6C illustrates a coding-unit extension syntax structure 610 according to an embodiment. In multi-view video, a coding-unit extension syntax structure includes a syntax element which is additionally needed in a coding-unit syntax structure. For example, the coding-unit extension syntax structure 610 includes intra skip prediction mode information for the intra skip mode. In the coding-unit extension syntax structure 610 according to an embodiment, the intra skip prediction mode information is expressed as skip_intra_mode_idx[x0][y0].

if(skip_intra_flag[x0][y0])

skip_intra_mode_idx[x0][y0]                              (Syntax 6)

Syntax 6 represents that skip_intra_mode_idx[x0][y0] which means that the intra skip prediction mode information is obtained when skip_intra_flag[x0][y0] which means an intra skip flag is '1'. According to a value of skip_intra_mode_idx[x0][y0], an intra prediction mode to be used to predict the current block is determined.

In one embodiment, when skip_intra_mode_idx[x0][y0] has a value of 0, the current block may be predicted according to the vertical mode. In one embodiment, when skip_intra_mode_idx[x0][y0] has a value of 1, the current block may be predicated according to the horizontal mode. In one embodiment, when skip_intra_mode_idx[x0][y0] has a value of 2, the current block may be predicted according to the vertical single mode. In one embodiment, when skip_intra_mode_idx[x0][y0] has a value of 3, the current block may be predicted according to the horizontal single mode.

In FIG. 6C, skip_intra_mode_idx[x0][y0] is one embodiment of the intra skip prediction mode information and thus the intra skip prediction mode information may be expressed differently.

The syntax structures illustrated in FIGS. 6A to 6C are merely some of various embodiments of expressing a video decoding method. Thus, a syntax structure for the intra skip mode may be expressed differently.

Figure 7:
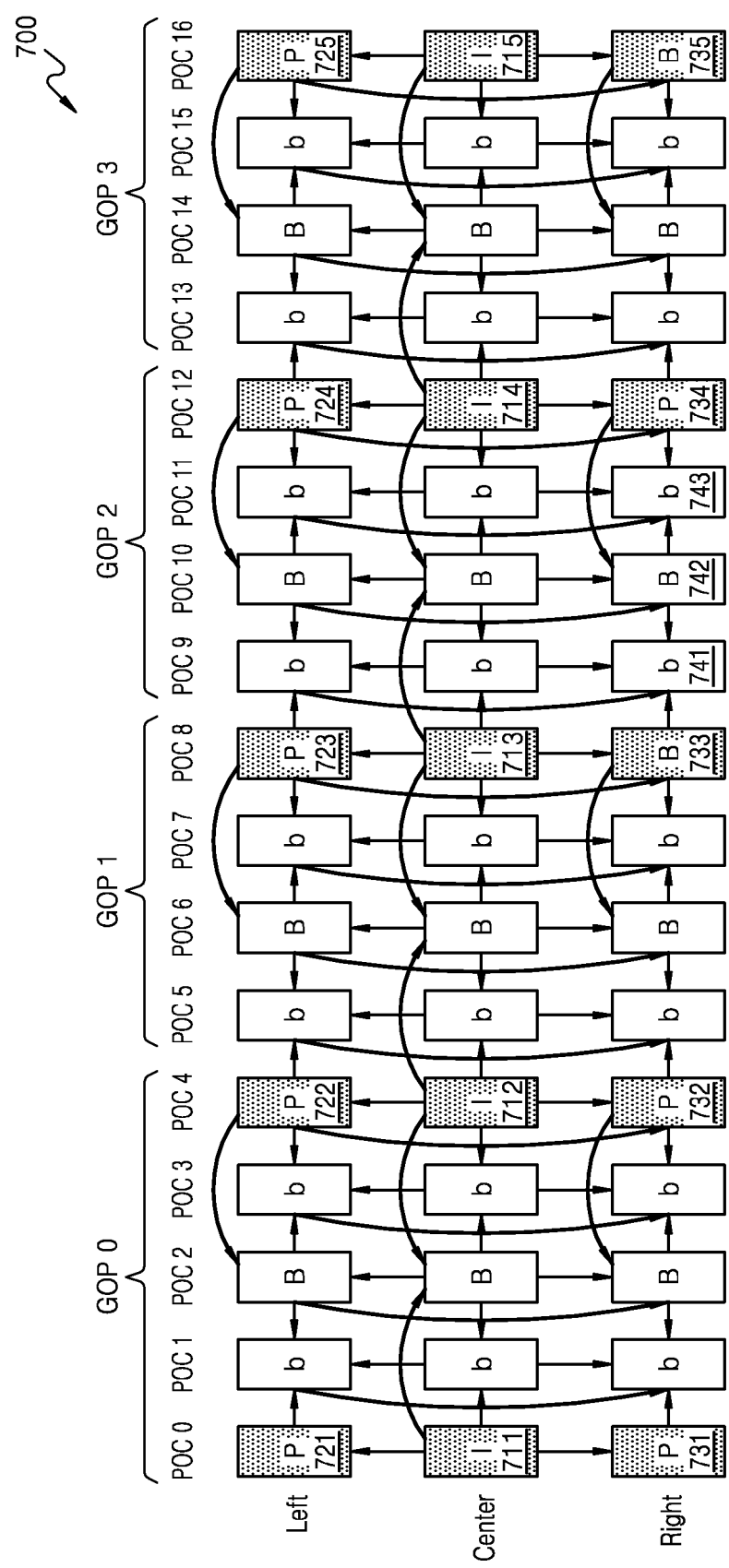
FIG. 7 illustrates a multi-view image prediction structure, according to an embodiment.

FIG. 7 illustrates a multi-view video prediction structure, according to an embodiment.

The video encoding apparatus 100 according to an embodiment may predict a base-view image and dependent-view images according to a reproduction order 700 of the multi-view video prediction structure shown in FIG. 7. In FIG. 7, although the base-view images and two dependent-view images are encoded, three or more dependent-view images may be encoded in another embodiment.

According to the multi-view video prediction structure 700 shown in FIG. 7, images of the same view are arranged in a horizontal direction. Thus, left-view images 'Left' are arranged in a line in the horizontal direction, center-view images 'Center' are arranged in a line in the horizontal direction, and right-view images 'Right' are arranged in a line in the horizontal direction. The center-view images may be base-view images, and the left-view images and the right-view images may be dependent-view images according to embodiments. According to another embodiment, the left-view images or the right-view images may be the base-view images.

In addition, images of the same picture order count (POC) are arranged in a vertical direction. The POC indicates a reproduction order of images included in a video. 'POC X' marked in the multi-view video prediction structure 700 indicates a relative reproduction order of images located in each column. A small value of X indicates an early reproduction order, and a large value thereof indicates a late reproduction order.

Therefore, based on the multi-view video prediction structure 700 of FIG. 7, the left-view images marked as 'Left' are arranged based on the POC in a horizontal direction, the base-view images marked as 'Center' are arranged based on the POC in a horizontal direction, and the right-view images marked as 'Right' are arranged based on the POC in a horizontal direction. In addition, a left-view image and a right-view image located at the same column as a base-view image have different views but have the same POC.

In FIG. 7, per view, four sequential images configure one group of pictures (GOP). Each GOP includes images located between two sequential anchor pictures, and one anchor picture (key picture). According to embodiments, the GOP may include images more than four images. Also, according to embodiments, different numbers of images may be included in each GOP. The number of images included in the GOP may be determined according to encoding/decoding efficiency.

An anchor picture is a random access point (RAP) picture. When a video is reproduced, if a reproduction location is arbitrarily selected among the images arranged based on a certain reproduction order, i.e., the POC, an anchor picture that is the closest to the reproduction location in POC is reproduced. The base-view images include base-view anchor pictures 711, 712, 713, 714, and 715, the left-view images include left-view anchor pictures 721, 722, 723, 724, and 725, and the right-view images include right-view anchor pictures 731, 732, 733, 734, and 735. The anchor picture shown in FIG. 7 is merely an example and may be located in a different POC according to encoding/decoding efficiency.

The multi-view images may be reproduced and predicted (reconstructed) in the order of the GOPs. Initially, according to the reproduction order 700 of the multi-view video prediction structure, per view, the images included in GOP 0 may be reproduced and then the images included in GOP 1 may be reproduced. That is, the images included in every GOP may be reproduced in the order of GOP 0, GOP 1, GOP 2, and GOP 3. In addition, based on a coding order of the multi-view video prediction structure, per view, the images included in GOP 0 may be predicted (reconstructed) and then the images included in GOP 1 may be predicted (reconstructed). That is, the images included in every GOP may be predicted (reconstructed) in the order of GOP 0, GOP 1, GOP 2, and GOP 3.

An inter prediction by the multi-view video prediction structure 700 includes a motion-compensated prediction (MCP) and a disparity-compensated prediction (DCP). MCP is an inter prediction that uses images located in temporally front and back of a current image having the same view as reference images. When a current block is predicted by MCP, a prediction unit of the current image is determined according to a motion vector and a reference image index with respect to the prediction unit of the current image. DCP is an inter prediction that uses images having different views in the same POC as reference images. When the current block is predicted by DCP, the prediction unit of the current image is determined according to a disparity vector and a reference image index with respect to the prediction unit of the current image. In FIG. 7, an image from which an arrow starts is a reference image, and an image to which the arrow is directed is an image to be predicted by using the reference image.

A result of predicting the base-view images may be encoded and then output in the form of a base-view bitstream, and a result of predicting the dependent-view images may be encoded and then output in the form of a dependent-view bitstream. For example, a result of prediction-encoding the center-view images in FIG. 7 may be output in the form of a base view bitstream, a result of prediction-encoding the left-view images may be output in the form of a first dependent bitstream, and a result of prediction-encoding the right-view images may be output in the form of a second dependent bitstream Only MCP is performed on the base-view images. Thus, only MCP is performed on the center-view images. That is, although the I-type anchor pictures 711, 712, 713, 714, and 715 do not refer to other pictures, the other B-type and b-type pictures are predicted with reference to other base-view images. The B-type pictures are predicted with reference to I-type anchor pictures preceding the same in POC 7 and I-type anchor pictures following the same in POC 7. The b-type pictures are predicted with reference to I-type anchor pictures preceding the same in POC 7 and B-type pictures following the same in POC order, or with reference to B-type anchor pictures preceding the same in POC order and I-type anchor pictures following the same in POC 7.

On the left-view images and the right-view images, MVP or DCP is performed. Thus, the left-view images may refer to the center-view images of the same POC or the right-view images of the same POC. Likewise, the right-view images may refer to the center-view images of the same POC or the left-view images of the same POC.

Inter-view prediction (interlayer prediction) may be performed on the left-view anchor pictures 721, 722, 723, 724, and 725 with reference to the base-view anchor pictures 711, 712, 713, 714, and 715 corresponding thereto in POC. Inter-view prediction may be performed on the right-view anchor pictures 731, 732, 733, 734, and 735 with reference to the base-view anchor pictures 711, 712, 713, 714, and 715 or the left-view anchor pictures 721, 722, 723, 724, and 725 corresponding thereto in POC. In addition, inter-view prediction may be performed on left-view non-anchor pictures and right-view non-anchor pictures with reference to other-view images corresponding thereto in POC.

The left-view non-anchor pictures and the right-view non-anchor pictures may be predicted with reference to images having the same view. Thus, left-view non-anchor pictures and the right-view non-anchor pictures may be predicted by MCP or DCP.

The video decoding apparatuses 200 and 400 according to an embodiment may reconstruct the center-view images, the left-view images, and the right-view images based on the multi-view video prediction structure 700 illustrated in FIG. 7.

The prediction order of the images shown in FIG. 7 is merely an embodiment. The images may be predicted according to different prediction orders for encoding/decoding efficiency.

Figure 8A:
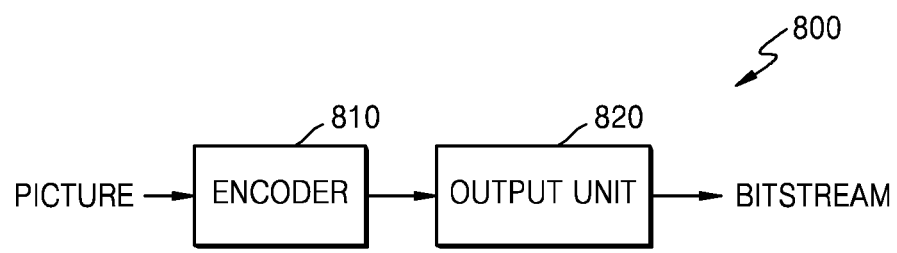
FIG. 8A is a block diagram of a video encoding apparatus based on coding units of a tree structure, according to an embodiment.

FIG. 8A is a block diagram of a video encoding apparatus based on coding units of a tree structure 800, according to an embodiment.

The video encoding apparatus involving video prediction based on coding units of the tree structure 800 includes an encoder 810 and an output unit 820. Hereinafter, for convenience of description, the video encoding apparatus involving video prediction based on coding units of the tree structure 800 is referred to as the 'video encoding apparatus 800'.

The encoder 810 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The encoder 810 encodes at least one split region obtained by splitting a region of the largest coding unit according to depths, and determines a depth to output a finally encoded image data according to the at least one split region. That is, the encoder 810 determines an encoding depth by encoding the image data in the deeper coding units according to depths, according to the largest coding unit of the current picture, and selecting a depth having the minimum encoding error. The determined encoding depth and image data according to largest coding units are output to the output unit 820.

The image data in the largest coding unit is encoded based on the deeper coding units corresponding to at least one depth equal to or deeper than the maximum depth, and results of encoding the image data based on each of the deeper coding units are compared. A depth having the minimum encoding error may be selected after comparing encoding errors of the deeper coding units. At least one encoding depth may be selected for each largest coding unit.

The size of the largest coding unit is split as a coding unit is hierarchically split according to depths, and as the number of coding units increases. Even if coding units correspond to the same depth in one largest coding unit, it is also determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the encoding depths may differ according to regions in the image data. Thus, one or more encoding depths may be determined in one largest coding unit, and the image data of the largest coding unit may be divided according to coding units of at least one encoding depth.

Accordingly, the encoder 810 according to the embodiment may determine coding units having a tree structure included in the largest coding unit. The 'coding units having a tree structure' according to an embodiment include coding units corresponding to a depth determined to be the encoding depth, from among all deeper coding units included in the largest coding unit. A coding unit of an encoding depth may be hierarchically determined according to depths in the same region of the largest coding unit, and may be independently determined in different regions. Equally, an encoding depth in a current region may be determined independently from an encoding depth in another region.

A maximum depth according to an embodiment is an index related to the number of splitting times from a largest coding unit to a smallest coding unit. A maximum depth according to an embodiment may denote the total number of splitting times from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the maximum depth may be set to 4.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 800 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of an encoding depth, i.e., based on the coding unit that is no longer split. Hereinafter, the coding unit that is no longer split and becomes a base unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type may selectively include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, and partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. The skip mode may also be performed only on the partition of 2N×2N. The encoding may be independently performed on one prediction unit in a coding unit, thereby selecting a prediction mode having a minimum encoding error.

The video encoding apparatus 800 according to the embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Encoding information according to encoding depths requires not only information about an encoding depth but also requires information related to prediction and transformation. Accordingly, the encoder 810 may determine not only a depth generating a minimum encoding error but may also determine a partition mode in which a prediction unit is split to partitions, a prediction type according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 15 through 24.

The encoder 810 may measure an encoding error of deeper coding units according to depths by using rate-distortion optimization based on Lagrangian multipliers.

The output unit 820 outputs, in bitstreams, the image data of the largest coding unit, which is encoded based on the at least one encoding depth determined by the encoder 810, and information about an encoding mode according to depths.

The encoded image data may correspond to a result obtained by encoding residual data of an image.

The information about the encoding mode according to depths may include encoding depth information, partition type information of the prediction unit, prediction mode information, and the size information of the transformation unit.

Encoding depth information may be defined by using split information according to depths, which specifies whether encoding is performed on coding units of a lower depth instead of a current depth. If the current depth of the current coding unit is an encoding depth, the current coding unit is encoded by using the coding unit of the current depth, and thus split information of the current depth may be defined not to split the current coding unit to a lower depth. On the contrary, if the current depth of the current coding unit is not the encoding depth, the encoding has to be performed on the coding unit of the lower depth, and thus the split information of the current depth may be defined to split the current coding unit to the coding units of the lower depth.

If the current depth is not the encoding depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of information about the encoding mode has to be determined for a coding unit of an encoding depth, at least one piece of information about the encoding mode may be determined for one largest coding unit. A depth of data of the largest coding unit may also vary according to locations since the data is hierarchically split according to encoding depths, and thus the encoding depth and the information about the encoding mode may be set for the data.

Accordingly, the output unit 820 according to the embodiment may assign encoding information about a corresponding encoding depth and an encoding mode to at least one of the coding unit, the prediction unit, and a minimum unit included in the largest coding unit.

The minimum unit according to an embodiment is a square data unit obtained by splitting the smallest coding unit constituting the lowermost encoding depth by 4. Alternatively, the minimum unit according to an embodiment may be a maximum square data unit that may be included in all of the coding units, prediction units, partition units, and transformation units included in the largest coding unit.

For example, the encoding information output by the output unit 820 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma value of an intra mode, and about an interpolation method during the intra mode.

Information about a maximum size of the coding unit defined according to pictures, slice segments, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 820 may encode and output reference information, prediction information, and slice segment type information, which are related to prediction.

According to the simplest embodiment for the video encoding apparatus 800, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may also maximally include four lower-depth coding units having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Since encoding may be performed on each largest coding unit by using any one of various prediction modes and transformations, an optimal encoding mode may also be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The video encoding apparatus described above with reference to FIG. 2A may include the video encoding apparatuses 800 corresponding to the number of views so as to encode texture images and depth images included in a plurality of views. For example, since three views are used in FIG. 7, three video encoding apparatuses 800 may be used to encode multi-view images of FIG. 7.

When the video encoding apparatuses 800 encode independent-view images, the encoder 810 may determine a prediction unit for inter-image prediction according to each of coding units of a tree structure in each largest coding unit, and may perform the inter-image prediction on each prediction unit.

When the video encoding apparatuses 800 encode dependent-view images, the encoder 810 may determine prediction units and coding units of a tree structure in each largest coding unit, and may perform inter-image prediction or inter-view prediction on each of the prediction units.

The video encoding apparatuses 800 may encode an inter-layer prediction error for predicting a current layer image by using an SAO. Thus, without having to encoding a prediction error according to sample locations, based on a sample value distribution of the prediction error, the prediction error of the current layer image may be encoded by using only an SAO type and information about an offset.

In one embodiment, the encoder 810 may perform functions of the encoding-method determiner 210, the intra skip prediction flag generator 220, and the intra skip prediction mode information generator 230 of FIG. 2A. In one embodiment, the output unit 820 may perform functions of the coding-information transmitter 240 of FIG. 2A.

Figure 8B:
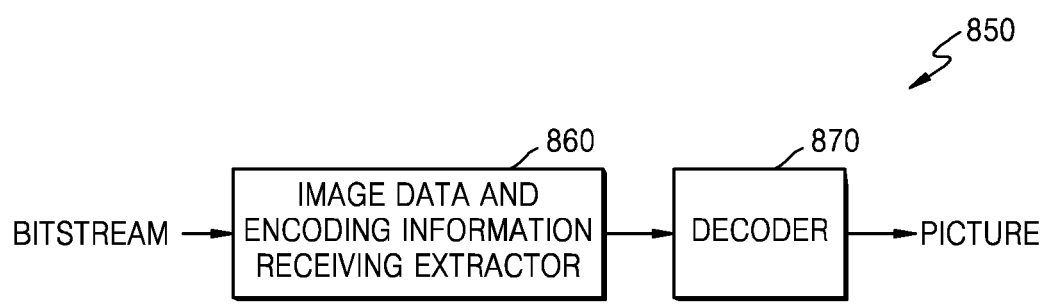
FIG. 8B is a block diagram of a video decoding apparatus based on coding units of a tree structure, according to an embodiment.

FIG. 8B illustrates a block diagram of a video decoding apparatus based on coding units of a tree structure 850, according to an embodiment.

The video decoding apparatus involving video prediction based on coding units of the tree structure 850 according to the embodiment includes an image data and encoding information receiving extractor 860 and a decoder 870. Hereinafter, for convenience of description, the video decoding apparatus involving video prediction based on coding units of the tree structure 850 according to the embodiment is referred to as the 'video decoding apparatus 850'.

Definitions of various terms, such as a coding unit, a depth, a prediction unit, a transformation unit, and various types of information about an encoding mode for decoding operations of the video decoding apparatus 850 according to the embodiment are identical to those described with reference to FIG. 8A and the video encoding apparatus 800.

The image data and encoding information receiving extractor 860 receives and parses a bitstream of an encoded video. The image data and encoding information receiving extractor 860 extracts encoded image data for each coding unit from the parsed bitstream, wherein the coding units have a tree structure according to each largest coding unit, and outputs the extracted image data to the decoder 870. The image data and encoding information receiving extractor 860 may extract information about a maximum size of a coding unit of a current picture, from a header about the current picture, a sequence parameter set, or a picture parameter set.

The image data and encoding information receiving extractor 860 also extracts, from the parsed bitstream, an encoding depth and information about the encoding mode having a tree structure according to each largest coding unit. The extracted encoding depth and the extracted information about the encoding mode are output to the decoder 870. That is, the image data in a bitstream is split into the largest coding unit so that the decoder 870 may decode the image data for each largest coding unit.

An encoding depth and information about the encoding mode according to each of the largest coding units may be set for one or more pieces of encoding depth information, and information about the encoding mode according to encoding depths may include partition type information of a corresponding coding unit, prediction mode information, and size information of a transformation unit. As the encoding depth information, the information about the encoding mode according to depths may also be extracted.

The encoding depth and the information about the encoding mode according to each of the largest coding units extracted by the image data and encoding information receiving extractor 860 are an encoding depth and information about the encoding mode determined to generate a minimum encoding error when an encoder, such as the video encoding apparatus 800, repeatedly performs encoding for each deeper coding unit according to depths according to each largest coding unit. Accordingly, the video decoding apparatus 850 may reconstruct an image by decoding data according to an encoding method that generates the minimum encoding error.

Since encoding information about the encoding depth and the encoding mode may be assigned to a predetermined data unit from among a corresponding coding unit, a prediction unit, and a minimum unit, the image data and encoding information receiving extractor 860 may extract the encoding depth and the information about the encoding mode according to the predetermined data units. If an encoding depth and information about the encoding mode of a corresponding largest coding unit are recorded according to each of the predetermined data units, predetermined data units having the same depth and the split information may be inferred to be the data units included in the same largest coding unit.

The decoder 870 reconstructs the current picture by decoding the image data in each largest coding unit based on the encoding depth and the information about the encoding mode according to each of the largest coding units. That is, the decoder 870 may decode the encoded image data, based on a read partition type, a prediction mode, and a transformation unit for each coding unit from among the coding units having the tree structure included in each largest coding unit. A decoding process may include a prediction process including intra prediction and motion compensation, and an inverse transformation process.

The decoder 870 may perform intra prediction or motion compensation according to a partition and a prediction mode of each coding unit, based on the information about the partition type and the prediction mode of the prediction unit of the coding unit according to encoding depths.

In addition, for inverse transformation for each largest coding unit, the decoder 870 may read information about a transformation unit according to a tree structure for each coding unit so as to perform inverse transformation based on transformation units for each coding unit. Due to the inverse transformation, a pixel value of a spatial domain of the coding unit may be reconstructed.

The decoder 870 may determine an encoding depth of a current largest coding unit by using split information according to depths. If the split information indicates that image data is no longer split in the current depth, the current depth is an encoding depth. Accordingly, the decoder 870 may decode the image data of the current largest coding unit by using the information about the partition type of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the decoder 870 in the same encoding mode. As such, the current coding unit may be decoded by obtaining the information about the encoding mode for each coding unit.

The video decoding apparatus described above with reference to FIGS. 1A and 3A may include the video decoding apparatuses 850 corresponding to the number of views, so as to decode texture images and depth images included in a plurality of views. For example, since three views are used in FIG. 7, the three video decoding apparatuses 850 may be used to decode the multi-view images of FIG. 7.

When an independent-view image stream about an independent-view image is received, the decoder 870 of the video decoding apparatus 850 may split samples of independent-view images, which are extracted from the independent-view image stream by the image data and encoding information receiving extractor 860, into coding units according to a tree structure of a largest coding unit. The decoder 870 may perform inter-image prediction on each of the coding units according to the tree structure of the samples of the reference layer images, and may reconstruct the independent-view images.

When a dependent view mage stream is received, the decoder 870 of the video decoding apparatus 850 may split samples of the dependent-view images, which are extracted from the dependent-view image stream by the image data and encoding information receiving extractor 860, into coding units according to a tree structure of a largest coding unit. The decoder 870 may perform inter-image prediction or inter-view prediction on each of the coding units of the samples of the second layer images, and may reconstruct the dependent-view images.

The image data and encoding information receiving extractor 860 may obtain an SAO type and an offset from the received current layer bitstream and determine an SAO category according to a distribution of sample values of each sample of a current layer prediction image, and thus obtaining offsets according to SAO categories by using the SAO type and the offset. Thus, although prediction errors according to samples are not received, the decoder 870 may compensate for an offset of a corresponding category for each sample of the current layer prediction image and may determine a current layer reconstruction image with reference to the compensated current layer prediction image.

Thus, the video decoding apparatus 850 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed according to a size of a coding unit and an encoding mode that are adaptively determined according to characteristics of the image, by using optimal information about the encoding mode received from an encoding terminal.

In one embodiment, the image data and encoding information receiving extractor 860 may perform the functions of the intra skip flag obtainer 110 and the intra skip prediction mode information obtainer 120 of FIG. 1A. In one embodiment, the decoder 870 may perform the functions of the predicted-value determiner 130 and the reconstructor 140 of FIG. 1A.

Figure 9:
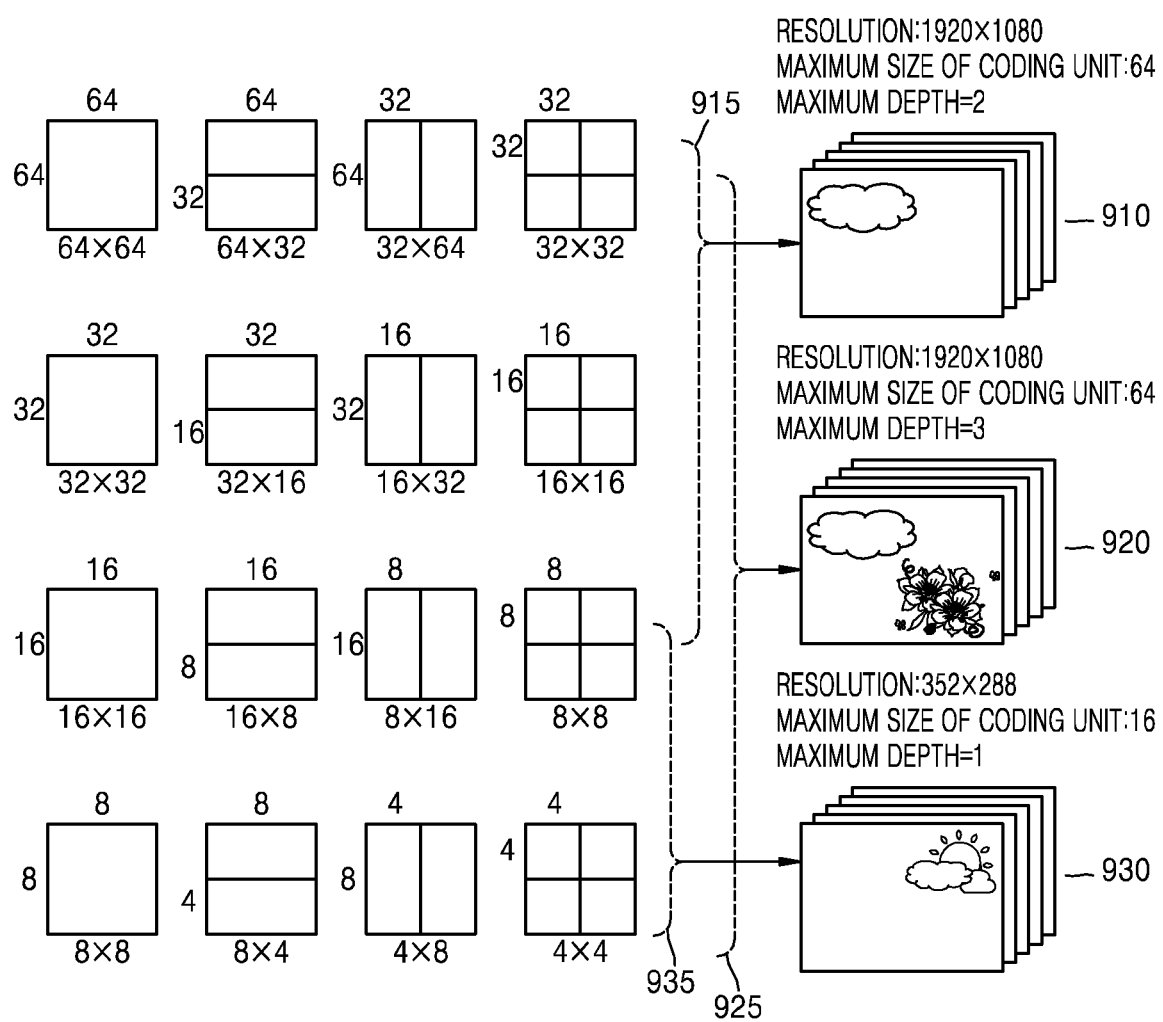
FIG. 9 illustrates a concept of coding units, according to an embodiment.

FIG. 9 illustrates a concept of coding units, according to an embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 910, a resolution is 1920×1080, a maximum size of a coding unit is 64, and a maximum depth is 2. In video data 920, a resolution is 1920×1080, a maximum size of a coding unit is 64, and a maximum depth is 3. In video data 930, a resolution is 352×288, a maximum size of a coding unit is 16, and a maximum depth is 1. The maximum depth shown in FIG. 9 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 910 and 920 having a higher resolution than the video data 930 may be selected to 64.

Since the maximum depth of the video data 910 is 2, coding units 915 of the vide data 910 may include a largest coding unit having a long axis size of 64, and coding units having long axis sizes of 32 and 16 since depths are deepened to two layers by splitting the largest coding unit twice. On the other hand, since the maximum depth of the video data 930 is 1, coding units 935 of the video data 930 may include a largest coding unit having a long axis size of 16, and coding units having a long axis size of 8 since depths are deepened to one layer by splitting the largest coding unit once.

Since the maximum depth of the video data 920 is 3, coding units 925 of the video data 920 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 10A:
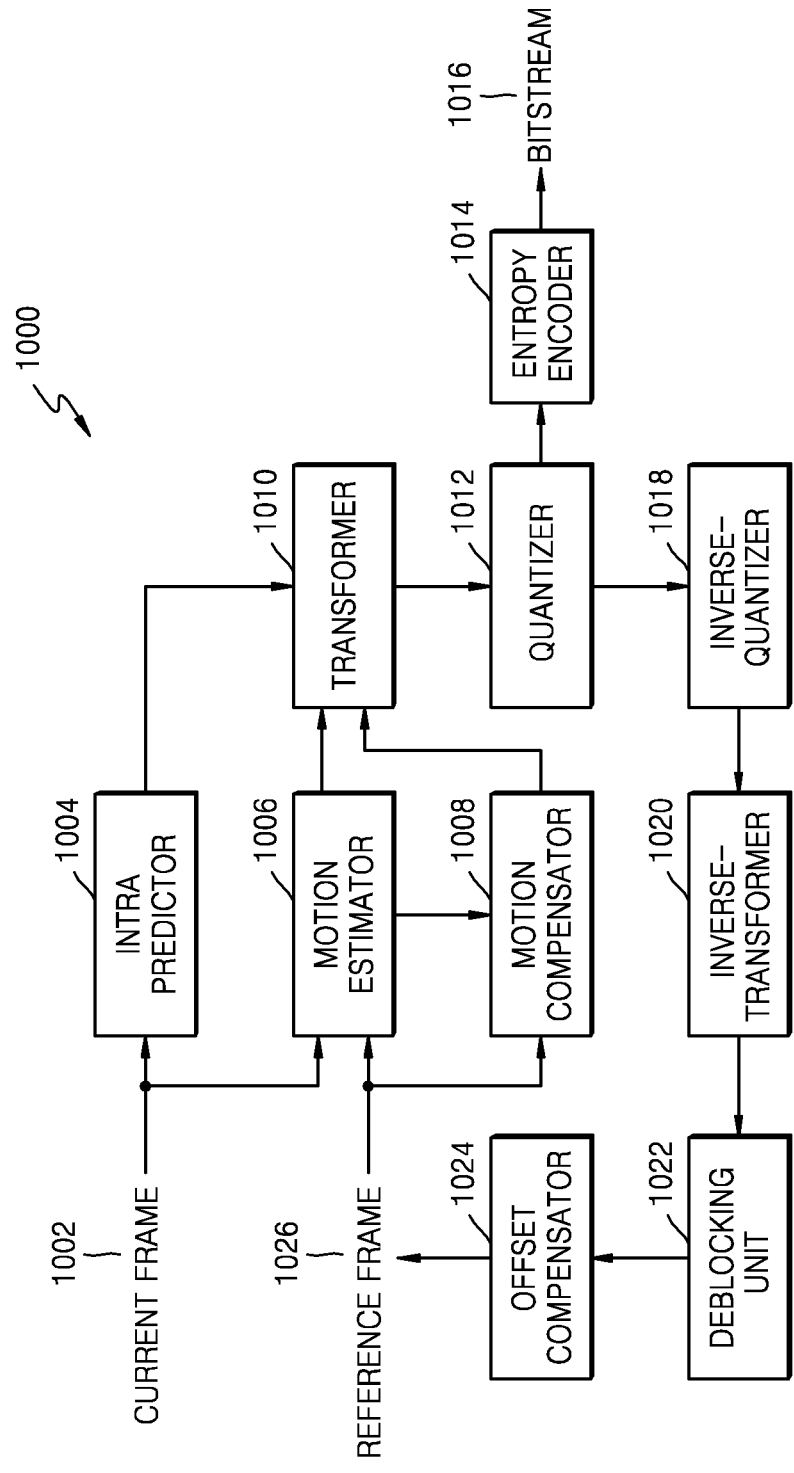
FIG. 10A is a block diagram of an image encoder based on coding units, according to an embodiment.

FIG. 10A is a block diagram of an image encoder 1000 based on coding units, according to an embodiment.

The image encoder 1000 according to an embodiment includes operations of an encoder 910 of the video encoding apparatus 900 so as to encode image data. That is, an intra predictor 1004 performs intra prediction on coding units in an intra mode, from among a current frame 1002, and a motion estimator 1006 and a motion compensator 1008 perform inter estimation and motion compensation by using the current frame 1002 of an inter mode and a reference frame 1026.

Data output from the intra predictor 1004, the motion estimator 1006, and the motion compensator 1008 is output as a quantized transformation coefficient through a data transformer 1010 and a quantizer 1012. The quantized transformation coefficient is reconstructed as data in a spatial domain through an inverse-quantizer 1018 and an inverse-transformer 1020. The reconstructed data in the spatial domain is post-processed through a deblocking unit 1022 and an offset compensator 1024 and is output as a reference frame 1026. The quantized transformation coefficient may be output as a bitstream 1016 through an entropy encoder 1014.

In order to be applied to the video encoding apparatus 900 according to an embodiment, all elements of the image encoder 1000, i.e., the intra predictor 1004, the motion estimator 1006, the motion compensator 1008, the transformer 1010, the quantizer 1012, the entropy encoder 1014, the inverse-quantizer 1018, the inverse-transformer 1020, the deblocking unit 1022, and the offset compensator 1024, have to perform operations based on each coding unit among coding units having a tree structure according to each largest coding unit in consideration of a maximum depth.

In particular, the intra predictor 1004, the motion estimator 1006, and the motion compensator 1008 may determine a partition and a prediction mode of each coding unit from among the coding units having a tree structure, by taking into account the maximum size and the maximum depth of a current largest coding unit, and the transformer 1010 has to determine a size of a transformation unit in each coding unit from among the coding units having a tree structure.

Figure 10B:
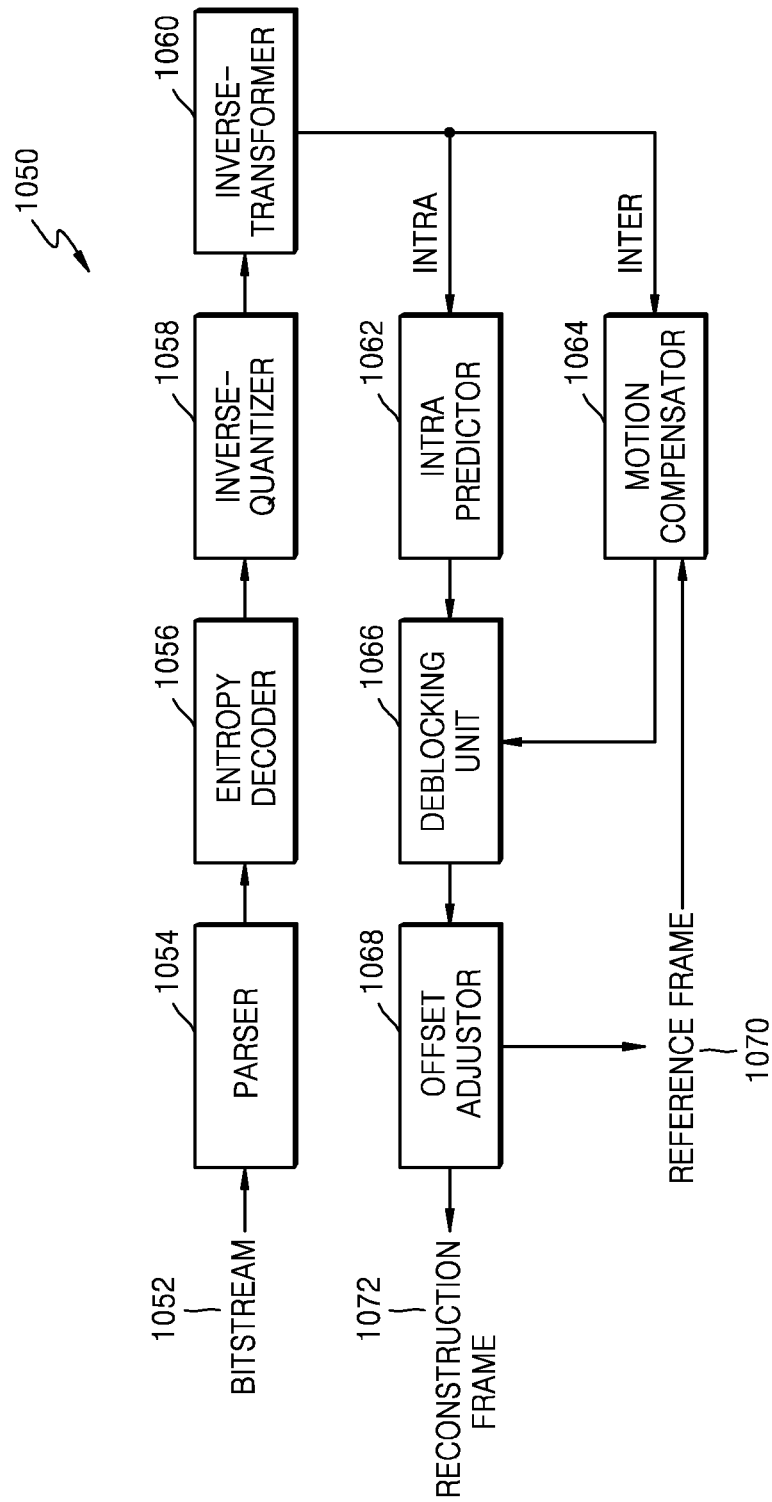
FIG. 10B is a block diagram of an image decoder based on coding units, according to an embodiment.

FIG. 10B is a block diagram of an image decoder 1050 based on coding units, according to an embodiment.

A bitstream 1052 is parsed as encoded image data to be decoded and information about encoding required for decoding through a parser 1054. The encoded image data is output as inverse-quantized data through an entropy encoder 1056 and an inverse-quantizer 1058. Image data in a spatial domain is reconstructed through an inverse-transformer 1060.

For the image data in the spatial domain, an intra predictor 1062 performs intra prediction on coding units of an intra mode, and a motion compensator 1064 performs motion compensation on coding units of an inter mode by using a reference frame 1070.

The data in the spatial domain through the intra predictor 1062 and the motion compensator 1064 may be post-processed through a deblocking unit 1066 and an offset adjustor 1068 and may be output as a reconstruction frame 1072. Also, the data post-processed through the deblocking unit 1066 and a loop filtering unit 1068 may be output as a reference frame 1070.

In order for a decoder 970 of the video decoding apparatus 1050 to decode the image data, operations after the parser 1054 of the image encoder 1050 according to an embodiment may be performed.

In order to be applied to the video decoding apparatus 950 according to an embodiment, all elements of the image encoder 1050, i.e., the parser 1054, the entropy decoder 1056, the inverse-quantizer 1058, the inverse-transformer 1060, the intra predictor 1062, the motion compensator 1064, the deblocking unit 1066, and the offset adjustor 1068 have to perform operations based on coding units having a tree structure for each largest coding unit.

In particular, the intra predictor 1062 and the motion compensator 1064 may determine a partition and a prediction mode of each of the coding units according to a tree structure, and the inverse-transformer 1060 has to determine a size of a transformation unit in each coding unit.

The encoding operation of FIG. 10A and the decoding operation of FIG. 10B are described as a videostream encoding operation and a videostream decoding operation, respectively, in a single layer. Thus, if the scalable video encoding apparatus 1200 of FIG. 12A encodes a videostream of two or more layers, the image encoder 1000 may be provided for each layer. Similarly, if the scalable video decoding apparatus 1250 of FIG. 12B decodes a videostream of two or more layers, the image encoder 1050 may be provided for each layer.

Figure 11:
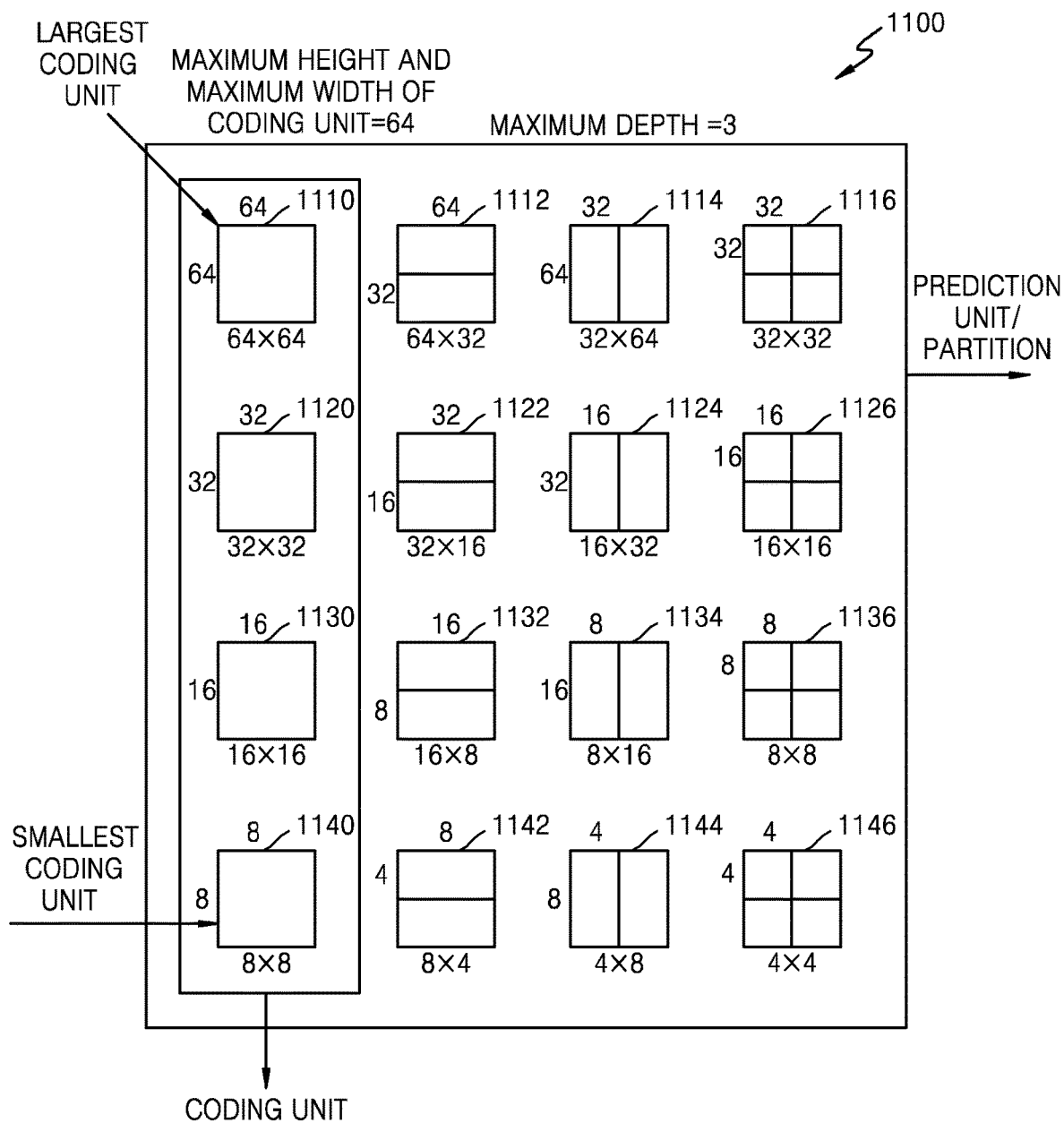
FIG. 11 illustrates deeper coding units according to depths, and partitions, according to an embodiment.

FIG. 11 illustrates deeper coding units according to depths, and partitions, according to an embodiment.

The video encoding apparatus 800 according to an embodiment and the video decoding apparatus 850 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1100 according to an embodiment, the maximum height and the maximum width of the coding units are each 64, and the maximum depth is 3. In this case, the maximum depth represents a total number of times the coding unit is split from the largest coding unit to the smallest coding unit. Since a depth deepens along a vertical axis of the hierarchical structure of coding units 1100, a height and a width of the deeper coding unit are each split. A prediction unit and partitions, which are bases for prediction encoding of each deeper coding unit, are also shown along a horizontal axis of the hierarchical structure of coding units 1100.

That is, a coding unit 1110 is a largest coding unit in the hierarchical structure of coding units 1100, wherein a depth is 0 and a size, i.e., a height by width, is 64×64. The depth deepens along the vertical axis, and a coding unit 1120 having a size of 32×32 and a depth of 1, a coding unit 1130 having a size of 16×16 and a depth of 2, and a coding unit 1140 having a size of 8×8 and a depth of 3. The coding unit 1140 having the size of 8×8 and the depth of 3 is a smallest coding unit.

The prediction unit and the partitions of a coding unit are arranged along the horizontal axis according to each depth. That is, if the coding unit 1110 having a size of 64×64 and a depth of 0 is a prediction unit, the prediction unit may be split into partitions include in the coding unit 1110 having the size of 64×64, i.e. a partition 1110 having a size of 64×64, partitions 1112 having the size of 64×32, partitions 1114 having the size of 32×64, or partitions 1116 having the size of 32×32.

Equally, a prediction unit of the coding unit 1120 having the size of 32×32 and the depth of 1 may be split into partitions included in the coding unit 1120 having the size of 32×32, i.e. a partition 1120 having a size of 32×32, partitions 1122 having a size of 32×16, partitions 1124 having a size of 16×32, and partitions 1126 having a size of 16×16.

Equally, a prediction unit of the coding unit 1130 having the size of 16×16 and the depth of 2 may be split into partitions included in the coding unit 1130 having the size of 16×16, i.e. a partition 1130 having a size of 16×16 included in the coding unit 1130, partitions 1132 having a size of 16×8, partitions 1134 having a size of 8×16, and partitions 1136 having a size of 8×8.

Equally, a prediction unit of the coding unit 1140 having the size of 8×8 and the depth of 3 may be split into partitions included in the coding unit 1140 having the size of 8×8, i.e. a partition 1140 having a size of 8×8 included in the coding unit 1140, partitions 1142 having a size of 8×4, partitions 1144 having a size of 4×8, and partitions 1146 having a size of 4×4.

In order to determine a depth of the largest coding unit 1110, the encoder 810 of the video encoding apparatus 800 according to an embodiment has to perform encoding on coding units respectively corresponding to depths included in the largest coding unit 1110.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 1100. The minimum encoding error may also be searched for by comparing representative encoding errors according to depths, by performing encoding for each depth as the depth deepens along the vertical axis of the hierarchical structure of coding units 1100. A depth and a partition generating the minimum encoding error in the largest coding unit 1110 may be selected as an encoding depth and a partition type of the largest coding unit 1110.

Figure 12:
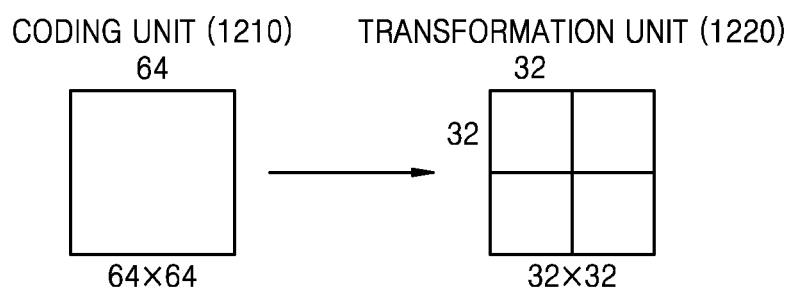
FIG. 12 illustrates a relationship between a coding unit and transformation units, according to an embodiment.

FIG. 12 illustrates a relationship between a coding unit and transformation units, according to an embodiment.

The video encoding apparatus 800 according to an embodiment or the video decoding apparatus 850 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 800 or the video decoding apparatus 850, when a size of the coding unit 1210 is 64×64, transformation may be performed by using the transformation units 1220 having a size of 32×32.

Data of the coding unit 1210 having the size of 64×64 may also be encoded by performing the transformation on each of the transformation units having the size of 32×32, 16×16, 8×8, and 4×4, which are smaller than 64×64, and then a transformation unit having the least coding error with respect to an original image may be selected.

Figure 13:
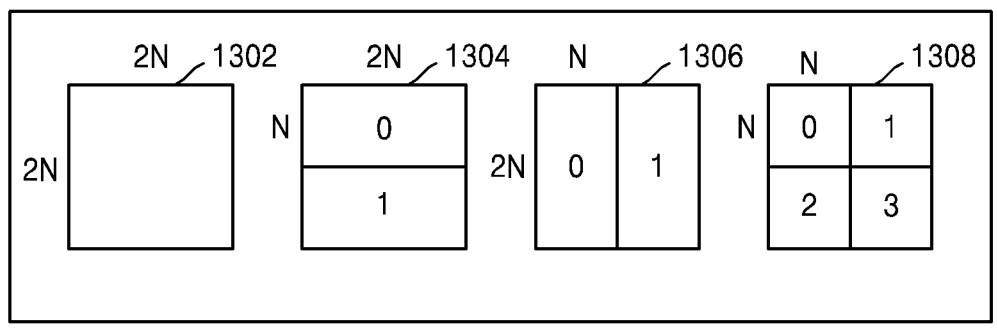
FIG. 13 illustrates a plurality of pieces of encoding information according to depths, according to an embodiment.
Figure 13:
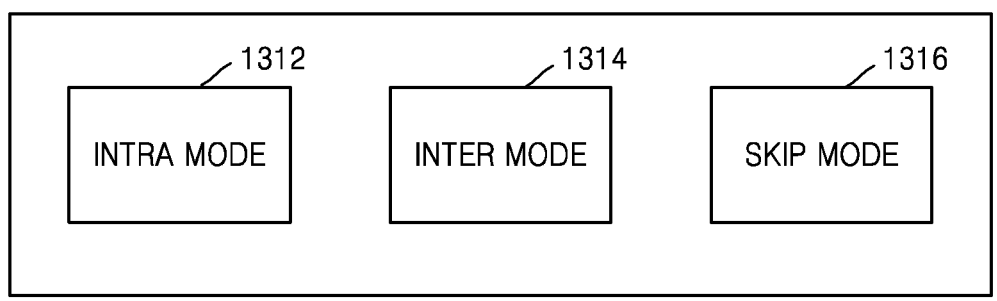
Figure 13:
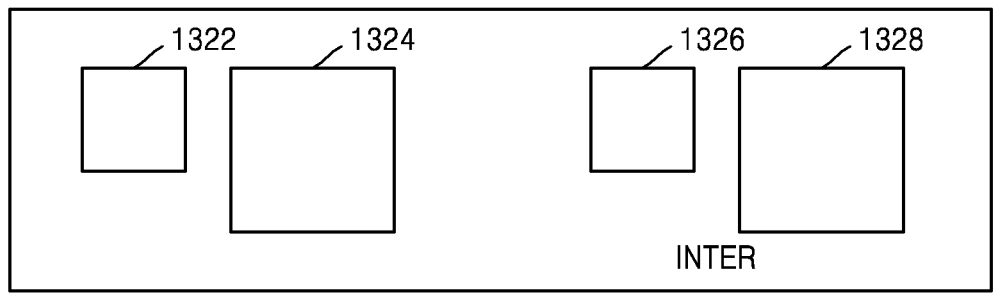

FIG. 13 illustrates a plurality of pieces of encoding information according to depths, according to various embodiments.

The output unit 820 of the video encoding apparatus 800 according to an embodiment may encode and transmit, as information about an encoding mode, partition type information 1300, prediction mode information 1310, and transformation unit size information 1320 for each coding unit corresponding to an encoding depth.

The partition type information 1300 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1302 having a size of 2N×2N, a partition 1304 having a size of 2N×N, a partition 1306 having a size of N×2N, and a partition 1308 having a size of N×N. In this case, the partition type information 1300 about a current coding unit is set to indicate one of the partition 1302 having a size of 2N×2N, the partition 1304 having a size of 2N×N, the partition 1306 having a size of N×2N, and the partition 1308 having a size of N×N.

The prediction mode information 1310 indicates a prediction mode of each partition. For example, the prediction mode information 1310 may indicate a mode of prediction encoding performed on a partition indicated by the partition type information 1300, i.e., an intra mode 1312, an inter mode 1314, or a skip mode 1316.

The transformation unit size information 1320 represents a transformation unit to be based on when transformation is performed on a current coding unit. For example, the transformation unit may be one of a first intra transformation unit 1322, a second intra transformation unit 1324, a first inter transformation unit 1326, and a second inter transformation unit 1328.

The image data and encoding information receiving extractor 860 of the video decoding apparatus 850 may extract and use the partition type information 1300, the prediction mode information 1310, and the transformation unit size information 1320 for decoding, according to each deeper coding unit.

Figure 14:
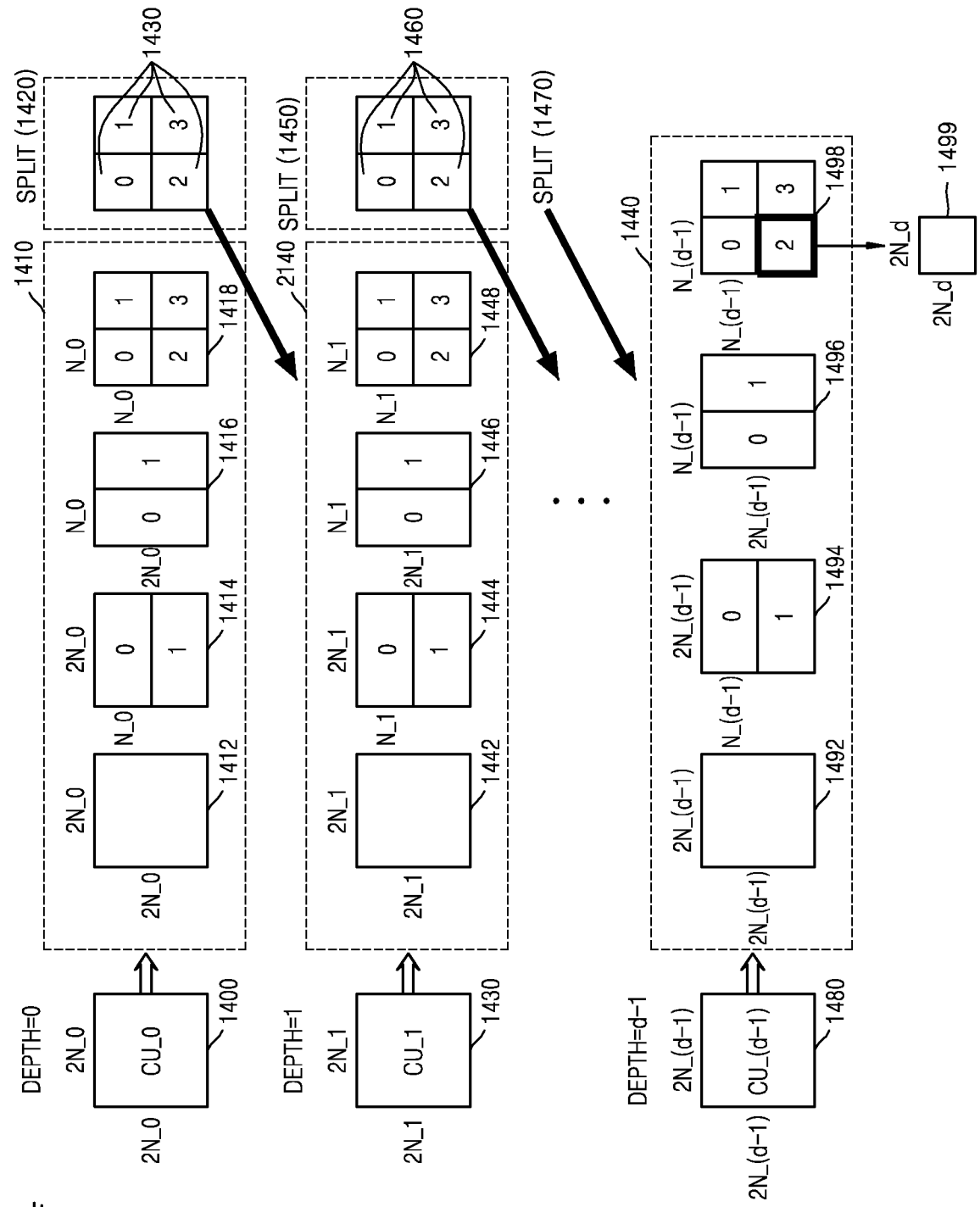
FIG. 14 illustrates deeper coding units according to depths, according to an embodiment.

FIG. 14 illustrates deeper coding units according to depths, according to various embodiments.

Split information may be used to represent a change in a depth. The spilt information specifies whether a coding unit of a current depth is split into coding units of a lower depth.

A prediction unit 1610 for prediction encoding a coding unit 1400 having a depth of 0 and a size of 2N_0×2N_0 may include partitions of a partition type 1412 having a size of 2N_0×2N_0, a partition type 1414 having a size of 2N_0×N_0, a partition type 1416 having a size of N_0×2N_0, and a partition type 1418 having a size of N_0×N_0. Only the partition types 1412, 1414, 1416, and 1418 which are obtained by symmetrically splitting the prediction unit are illustrated, but as described above, a partition type is not limited thereto and may include asymmetrical partitions, partitions having a predetermined shape, and partitions having a geometrical shape.

According to each partition type, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 1412, 1414, and 1416 having the sizes of 2N_0×2N_0, 2N_0×N_0 and N_0×2N_0, the prediction unit 1610 may not be split into a lower depth.

If the encoding error is the smallest in the partition type 1418 having the size of N_0×N_0, a depth is changed from 0 to 1 and split is performed (operation 1620), and encoding may be repeatedly performed on coding units 1430 of a partition type having a depth of 2 and a size of N_0×N_0 so as to search for a minimum encoding error.

A prediction unit 1630 for prediction encoding the coding unit 1430 having a depth of 1 and a size of 2N_1×2N_1 (=N_0×N_0) may include a partition type 1442 having a size of 2N_1×2N_1, a partition type 1444 having a size of 2N_1×N_1, a partition type 1446 having a size of N_1×2N_1, and a partition type 1448 having a size of N_1×N_1.

If an encoding error is the smallest in the partition type 1448 having the size of N_1×N_1, a depth is changed from 1 to 2 and split is performed (in operation 1450), and encoding is repeatedly performed on coding units 1460 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 1470), a prediction unit 1490 for prediction encoding a coding unit 1480 having a depth of d−1 and a size of 2N_(d−1)×2N_(d−1) may include partitions of a partition type 1492 having a size of 2N_(d−1)×2N_(d−1), a partition type 1494 having a size of 2N_(d−1)×N_(d−1), a partition type 1496 having a size of N_(d−1)×2N_(d−1), and a partition type 1498 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types so as to search for a partition type generating a minimum encoding error.

Even when the partition type 1498 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1400 is determined to be d−1 and a partition type of the current largest coding unit 1400 may be determined to be N_(d−1)×N_(d−1). Since the maximum depth is d, split information for a coding unit 1452 corresponding to a depth of d−1 is not also set.

A data unit 1499 may be a 'minimum unit' for the current largest coding unit. A minimum unit according to the embodiment may be a square data unit obtained by splitting a smallest coding unit having a lowermost encoding depth by 4. By performing the encoding repeatedly, the video encoding apparatus 100 according to the embodiment may select an encoding depth having the minimum encoding error by comparing encoding errors according to depths of the coding unit 1400 to determine a depth, and set a corresponding partition type and a prediction mode as an encoding mode of the encoding depth.

As such, the minimum encoding errors according to depths are compared in all of the depths of 0, 1, . . . , d−1, d, and a depth having the minimum encoding error may be determined as an encoding depth. The encoding depth, the partition type of the prediction unit, and the prediction mode may be encoded and transmitted as information about the encoding mode. Since a coding unit has to be split from a depth of 0 to an encoding depth, only split information of the encoding depth is also set to '0', and split information of depths excluding the encoding depth is also set to '1'.

The image data and encoding information receiving extractor 860 of the video decoding apparatus 850 according to the embodiment may extract and use an encoding depth and prediction unit information about the coding unit 1400 so as to decode the coding unit 1412. The video decoding apparatus 850 according to the embodiment may determine a depth, in which split information is '0', as an encoding depth by using split information according to depths, and may use, for decoding, information about the encoding mode with respect to the corresponding depth.

Figure 15:
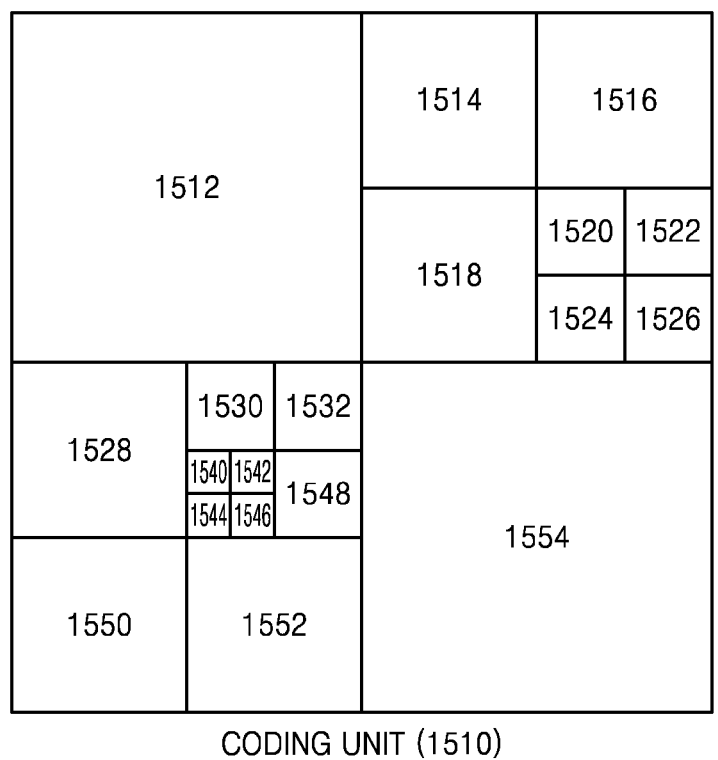
FIGS. 15, 16, and 17 illustrate a relationship between coding units, prediction units, and transformation units, according to an embodiment.
Figure 16:
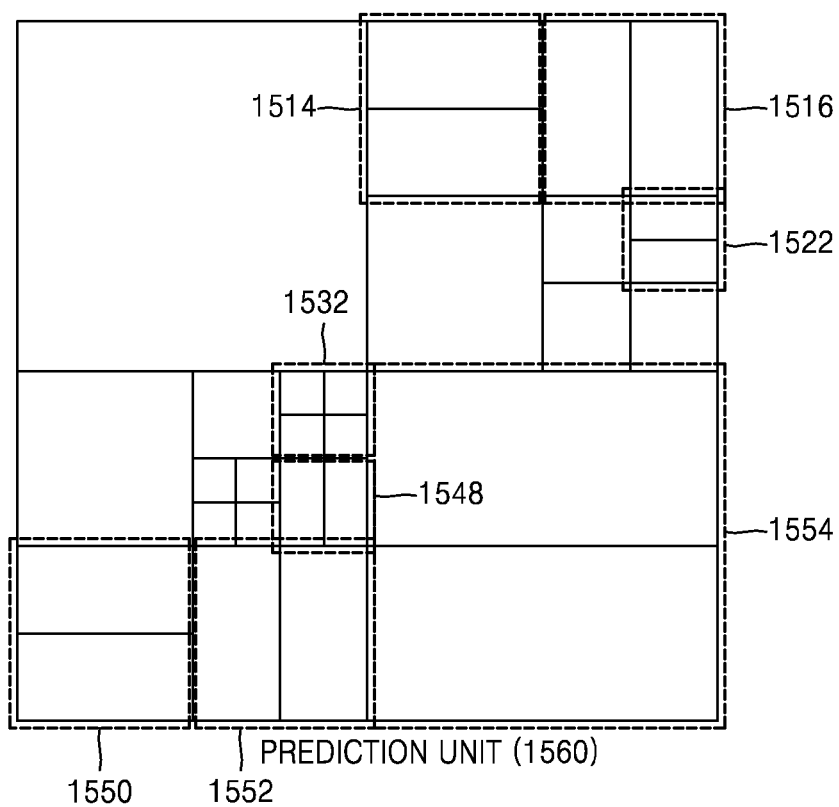
Figure 17:
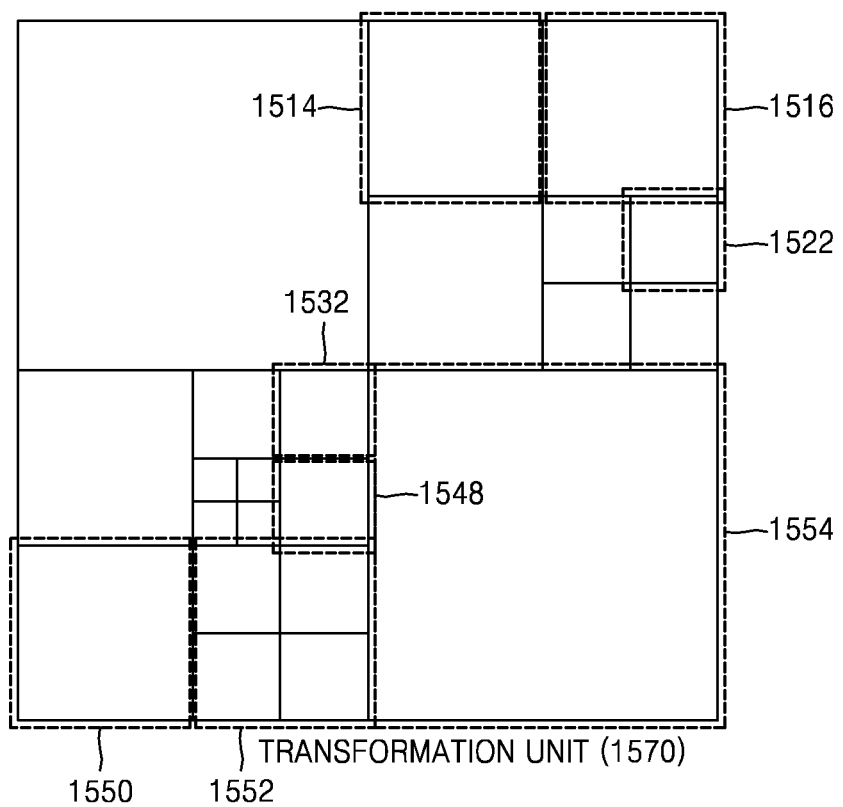

FIGS. 15, 16, and 17 illustrate a relationship between coding units, prediction units, and transformation units, according to various embodiments.

Coding units 1510 are deeper coding units according to encoding depths determined by the video encoding apparatus 800, in a largest coding unit. Prediction units 1560 are partitions of prediction units of each of the coding units 1510 according to encoding depths, and transformation units 1570 are transformation units of each of the coding units according to encoding depths.

When a depth of a largest coding unit is 0 in the deeper coding units 1510, depths of coding units 1512 are 1, depths of coding units 1514, 1516, 1518, 1528, 1550, and 1552 are 2, depths of coding units 1520, 1522, 1524, 1526, 1530, 1532, and 1548 are 3, and depths of coding units 1540, 1542, 1544, and 1546 are 4.

Some partitions 1514, 1516, 1522, 1532, 1548, 1550, 1552, and 1554 from among the prediction units 1560 are obtained by splitting the coding unit. That is, partitions 1514, 1522, 1550, and 1554 are a partition type having a size of 2N×N, partitions 1516, 1548, and 1552 are a partition type having a size of N×2N, and a partition 1532 is a partition type having a size of N×N. Prediction units and partitions of the deeper coding units 1510 are smaller than or equal to each coding unit.

Transformation or inverse transformation is performed on image data of the coding unit 1552 in the transformation units 1570 in a data unit that is smaller than the coding unit 1552. The coding units 1514, 1516, 1522, 1532, 1548, 1550, 1552, and 1554 in the transformation units 1560 are also data units different from those in the prediction units 1560 in terms of sizes or shapes. That is, the video encoding apparatus 800 and the video decoding apparatus 850 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition type information, prediction mode information, and transformation unit size information. Table 1 below shows the encoding information that may be set by the video encoding apparatus 800 and the video decoding apparatus 850 according to the embodiments.

TABLE 1

| | Split Information 0 (Encoding on Coding Unit having Size of 2N × 2N and Current Depth of d) | | | | Split Information 1 |
|---|---|---|---|---|---|
| Prediction Mode | Partition Type | | Size of Transformation Unit | | |
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) | Repeatedly Encode Coding Units having Lower Depth of d + 1 |

TABLE 1-continued

| Split Information 0 (Encoding on Coding Unit having Size of 2N × 2N and Current Depth of d) | | | Split Information 1 |
|---|---|---|---|
| Prediction Mode | Partition Type | Size of Transformation Unit | |
| | | N/2 × N/2 (Asymmetrical Partition Type) | |

The output unit 820 of the video encoding apparatus 100 according to the embodiment may output the encoding information about the coding units having a tree structure, and the image data and encoding information receiving extractor 860 of the video decoding apparatus 850 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is an encoding depth, and thus partition type information, prediction mode information, and transformation unit size information may be defined for the encoding depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The partition type information may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. If a partition type of the current coding unit having the size of 2N×2N is a symmetrical partition type, a size of a transformation unit may also be N×N. If the partition type of the current coding unit is an asymmetrical partition type, the size of the transformation unit may also be N/2×N/2.

The encoding information about coding units having a tree structure according to an embodiment may be assigned to at least one of a coding unit corresponding to an encoding depth, a prediction unit, and a minimum unit. The coding unit corresponding to the encoding depth may include one or more prediction units and minimum units containing the same encoding information.

Accordingly, it may be determined whether adjacent data units are included in the same coding unit corresponding to the coded encoding depth by comparing encoding information of the adjacent data units. A coding unit corresponding to the coded encoding depth is also determined by using encoding information of a data unit, and thus distribution of encoding depths in a largest coding unit may be inferred.

Accordingly, in this case, if prediction of a current coding unit is performed based on adjacent data units, encoding information of data units in deeper coding units adjacent to the current coding unit may be directly referred to and used.

In another embodiment, if prediction of the current coding unit is performed encoded based on adjacent coding units, data adjacent to the current coding unit may be searched within deeper coding units by using encoded information of adjacent deeper coding units, and thus the adjacent coding units may be referred.

Figure 18:
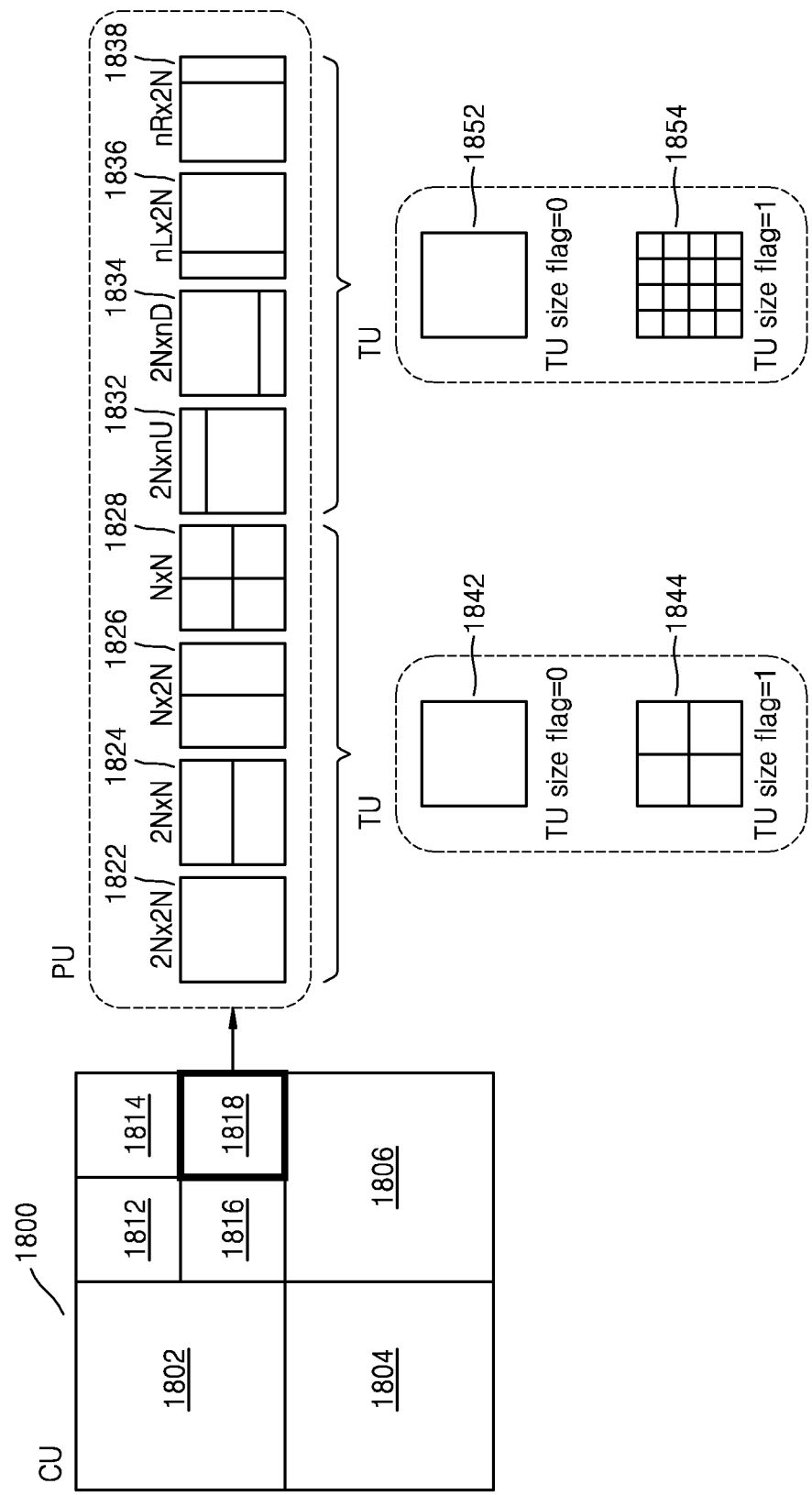
FIG. 18 illustrates a relationship between a coding unit, a prediction unit, and a transformation unit, according to encoding mode information of Table 1.

FIG. 18 illustrates a relationship between a coding unit, a prediction unit, and a transformation unit, according to encoding mode information of Table 1.

A largest coding unit 1800 includes coding units 1802, 1804, 1806, 1812, 1814, 1816, and 1818 of encoding depths. Here, since the coding unit 1818 is a coding unit of an encoding depth, split information may be set to 0. Partition type information of the coding unit 1818 having a size of 2N×2N may be set to be one of partition types including 2N×2N 1822, 2N×N 1824, N×2N 1826, N×N 1828, 2N×nU 1832, 2N×nD 1834, nL×2N 1836, and nR×2N 1838.

Transformation unit split information (TU size flag) is a type of a transformation index, and a size of a transformation unit corresponding to the transformation index may be changed according to a prediction unit type or partition type of the coding unit.

For example, when the partition type information is set to be one of symmetrical partition types 2N×2N 1822, 2N×N 1824, N×2N 1826, and N×N 1828, if the transformation unit split information is 0, a transformation unit 1842 having a size of 2N×2N is set, and if the transformation unit split information is 1, a transformation unit 1844 having a size of N×N may be set.

When the partition type information is set to be one of asymmetrical partition types 2N×nU 1832, 2N×nD 1834, nL×2N 1836, and nR×2N 1838, if the transformation unit split information (TU size flag) is 0, a transformation unit 1852 having a size of 2N×2N may be set, and if the transformation unit split information is 1, a transformation unit 1854 having a size of N/2×N/2 may be set.

The transformation unit split information (TU size flag) described above with reference to FIG. 12 is a flag having a value of 0 or 1, but the transformation unit split information according to an embodiment is not limited to a flag having 1 bit, and the transformation unit may be hierarchically split while the transformation unit split information increases in a manner of 0, 1, 2, 3, etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 850 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize} = \max(\text{MinTransformSize}, \text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 15 through 18, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The embodiments of the present disclosure may be written as computer programs and may be implemented in general-use digital computers that execute the programs by using a non-transitory computer-readable recording medium. Examples of the non-transitory computer-readable recording medium include magnetic storage media (e.g., ROM, floppy disks, hard disks, etc.), optical recording media (e.g., CD-ROMs, or DVDs), etc.

For convenience of description, the scalable video encoding methods and/or the video encoding method, which are described with reference to FIGS. 6A through 18, will be collectively referred to as 'the video encoding method of the present disclosure'. The scalable video decoding methods and/or the video decoding method, which are described with reference to FIGS. 6A through 18, will also be collectively referred to as 'the video decoding method of the present disclosure'.

A video encoding apparatus including the scalable video decoding apparatus 1200, the video encoding apparatus 800 or the image encoder 1000 which are described with reference to FIGS. 6A through 18 will also be collectively referred to as a 'video encoding apparatus of the present disclosure'. A video decoding apparatus including the scalable video decoding apparatus 1250, the video decoding apparatus 850, or the image encoder 1050 which are described with reference to FIGS. 6A through 18 will also be collectively referred to as a 'video decoding apparatus of the present disclosure'.

The non-transitory computer-readable recording medium such as a disc 26000 that stores the programs according to an embodiment will now be described in detail.

Figure 19:
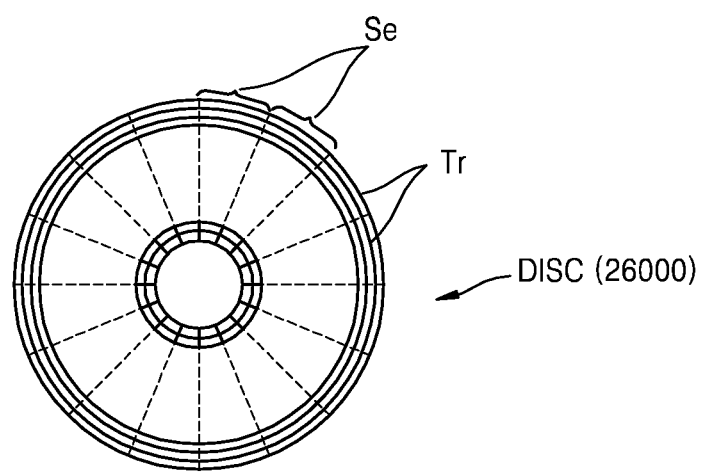
FIG. 19 illustrates a physical structure of a disc in which a program is stored, according to an embodiment.

FIG. 19 illustrates a physical structure of the disc 26000 in which a program is stored, according to an embodiment. The disc 26000, as a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 21.

Figure 20:
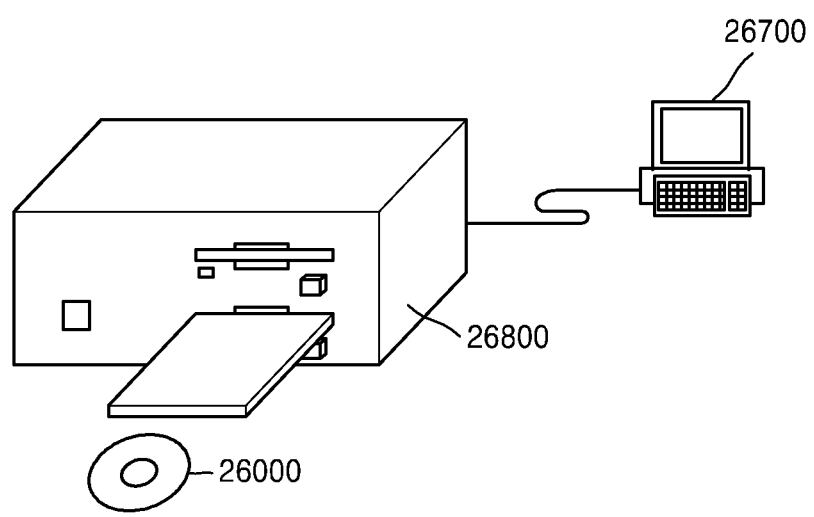
FIG. 20 illustrates a disc drive for recording and reading a program by using the disc.

FIG. 20 illustrates a disc drive 26800 for recording and reading a program by using the disc 26000. A computer system 26700 may store a program that executes at least one of the video encoding method and the video decoding method of the present disclosure, in the disc 26000 via the disc drive 26800. In order to run the program stored in the disc 26000 in the computer system 26700, the program may be read from the disc 26000 and may be transmitted to the computer system 26700 by using the disc drive 26800.

Figure 21:
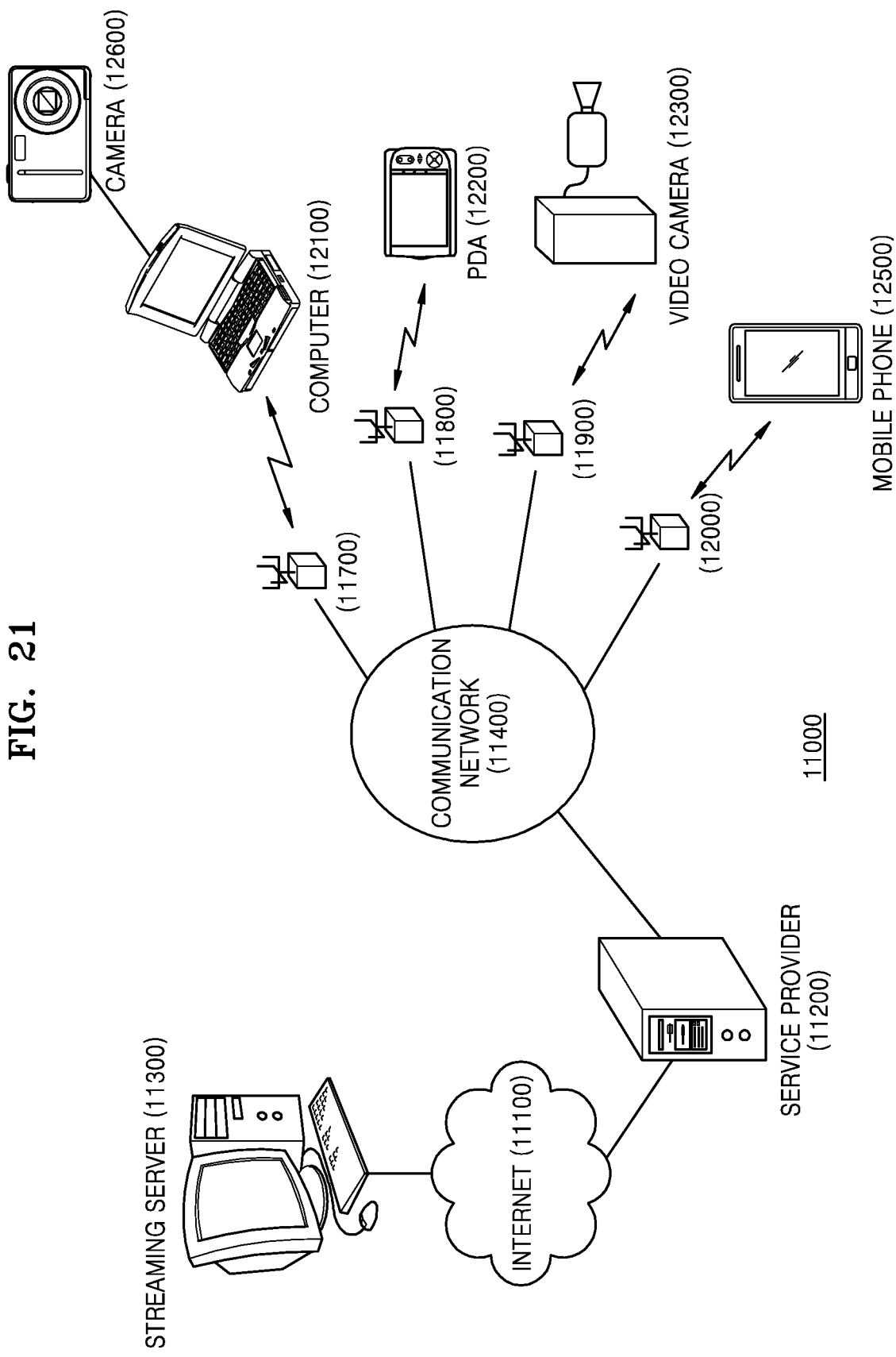
FIG. 21 illustrates an overall structure of a content supply system for providing a content distribution service.

The program that executes at least one of the video encoding method and the video decoding method of the present disclosure may be stored not only in the disc 26000 illustrated in FIGS. 19 and 21 but may also be stored in a memory card, a ROM cassette, or a solid state drive (SSD).

A system to which the video encoding method and the video decoding method according to the embodiments described above are applied will be described below.

FIG. 21 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 21, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a non-transitory computer-readable recording medium, e.g., a CD-ROM disc, a floppy disc, a hard disc drive, an SSD, or a memory card, which may be accessed by the computer 12100.

If video data is captured by a camera built in the mobile phone 12500, the video data may be received from the mobile phone 12500.

The video data may be encoded by a large scale integrated circuit (LSI) system installed in the video camera 12300, the mobile phone 12500, or the camera 12600.

In the content supply system 11000 according to an embodiment, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. The content supply system 11000 also allows the clients to receive the encoded content data and decode and reproduce the encoded content data in real time, thereby enabling personal broadcasting.

The video encoding apparatus and the video decoding apparatus of the present disclosure may be applied to encoding and decoding operations of the plurality of independent devices included in the content supply system 11000.

Figure 22:
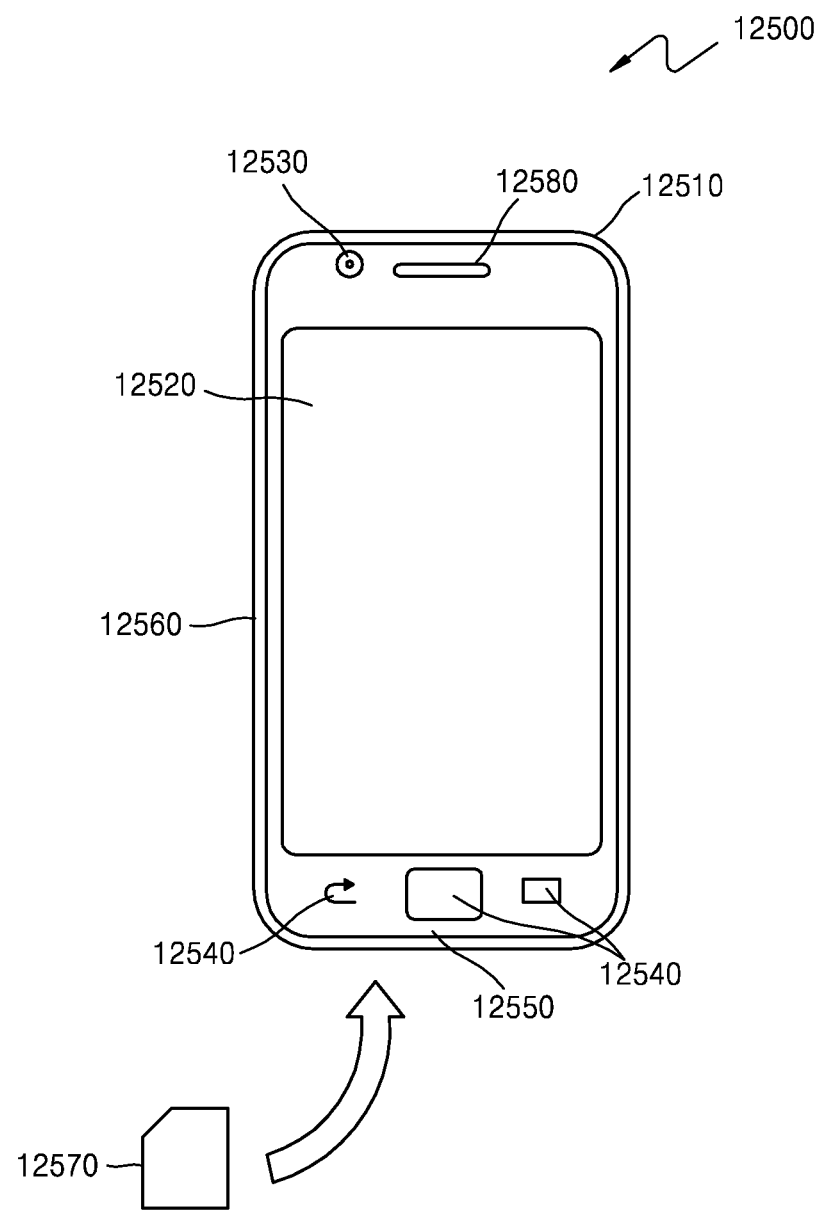
FIGS. 22 and 23 illustrate an external structure and an internal structure of a mobile phone to which the video encoding method and the video decoding method are applied, according to an embodiment.
Figure 24:
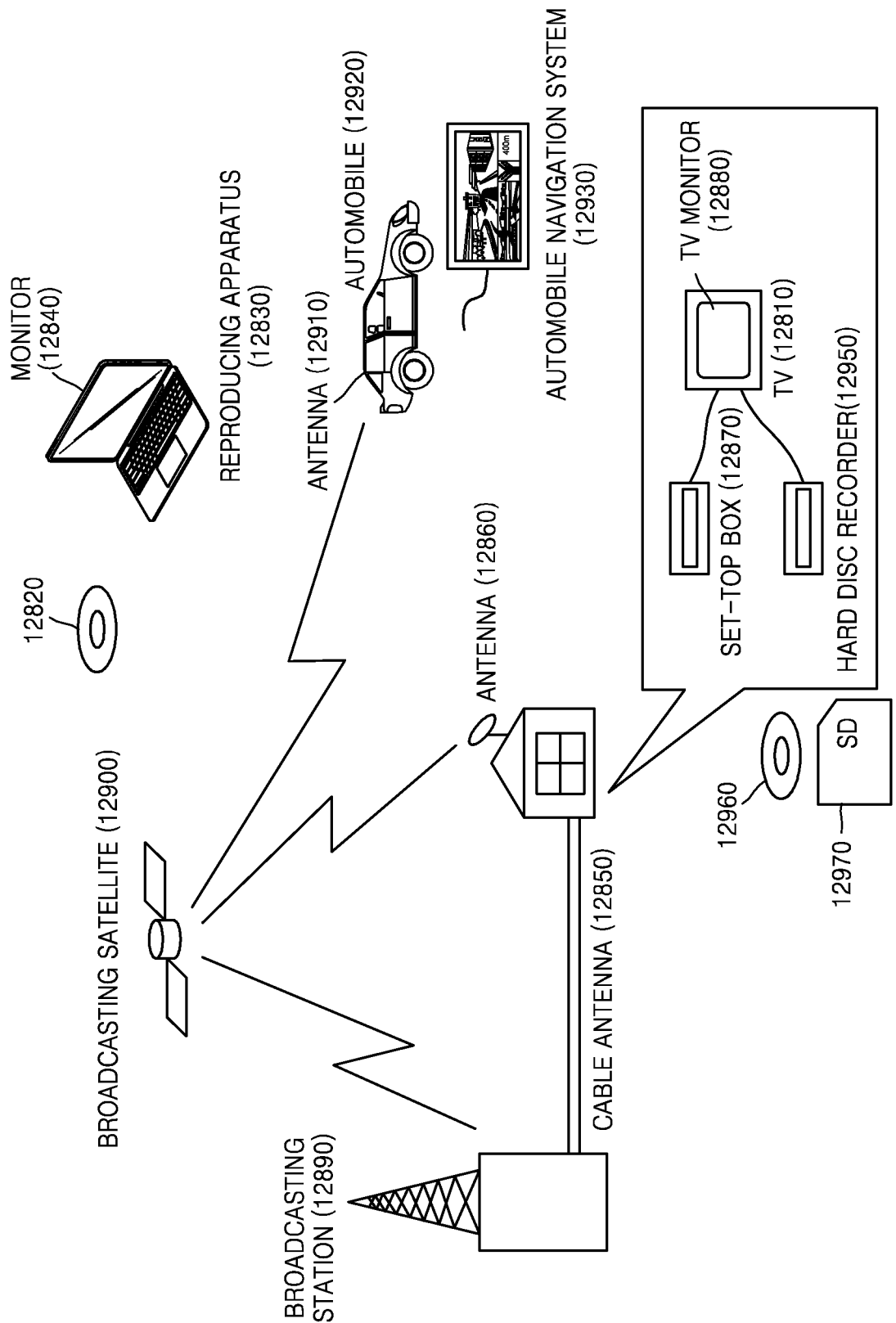
FIG. 24 illustrates a digital broadcasting system employing a communication system, according to an embodiment.

With reference to FIGS. 22 and 24, the mobile phone 12500 included in the content supply system 11000 according to an embodiment will now be described in detail.

FIG. 22 illustrates an external structure of the mobile phone 12500 to which a video encoding method and a video decoding method are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 23:
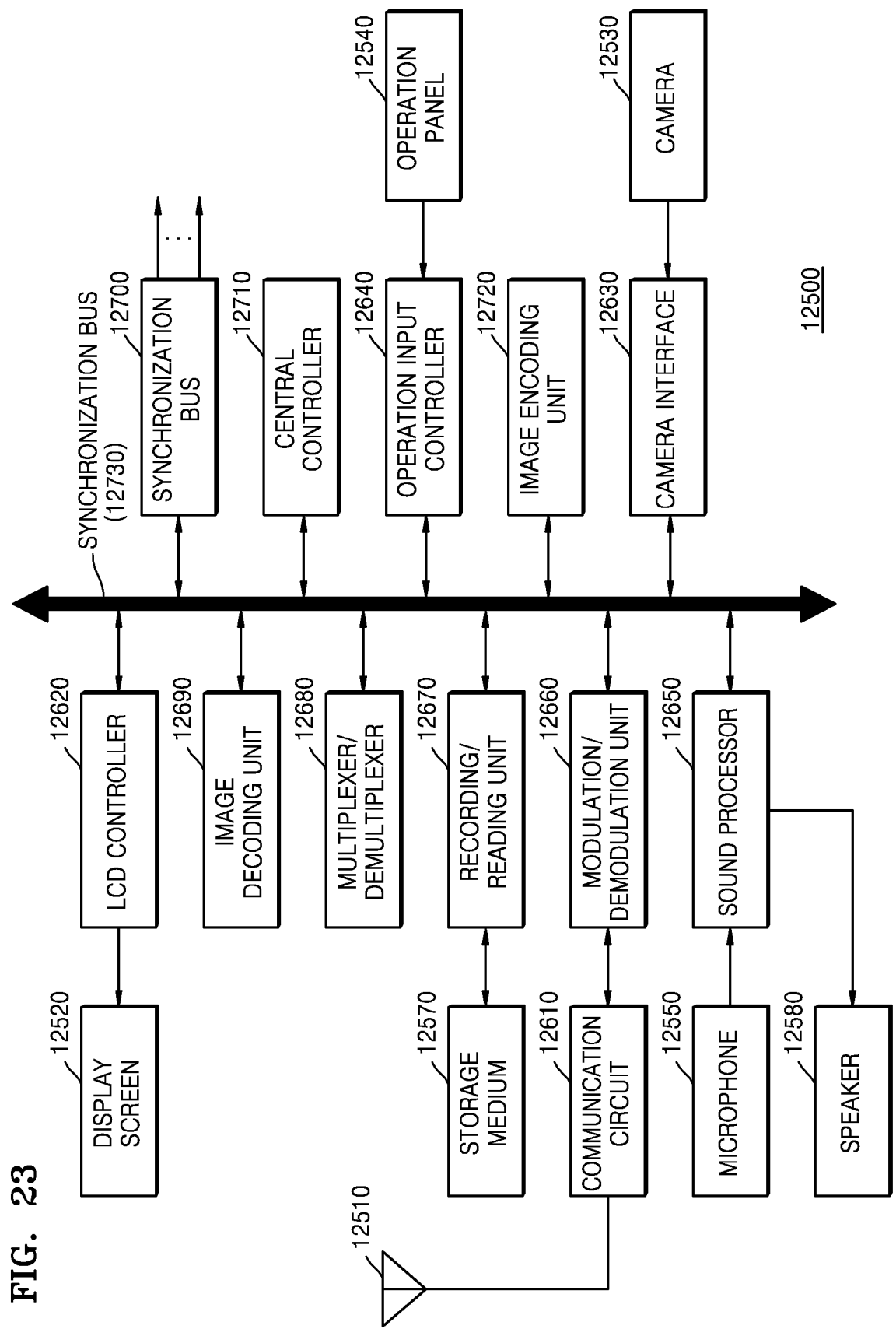

FIG. 23 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a CPU, a read-only memory (ROM), and a random access memory (RAM).

While the mobile phone 12500 transmits communication data to the outside, a digital signal is generated by the mobile phone 12500 by the control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by the control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The digital sound signal may be converted to a transmission signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By the control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is converted to an analog sound signal via the modulation/demodulation unit 12660 and the sound processor 12650, and the analog sound signal is output via the speaker 12580 by the control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method of the present disclosure.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 1150 or another type of communication terminal may be a transceiving terminal including both a video encoding apparatus and a video decoding apparatus according to an exemplary embodiment, may be a transmitting terminal including only the video encoding apparatus, or may be a receiving terminal including only the video decoding apparatus.

A communication system according to an embodiment is not limited to the communication system described above with reference to FIG. 21. For example, FIG. 24 illustrates a digital broadcasting system employing a communication system, according to an embodiment. The digital broadcasting system of FIG. 24 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present disclosure may be installed. Data output from the set-top box 12870 may also be reproduced on a TV monitor 12880.

As another example, the video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present disclosure and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 26. For example, the computer 12100 and the TV receiver 12810 may not include the camera 12530, the camera interface 12630, and the image encoder 12720 of FIG. 23.

Figure 25:
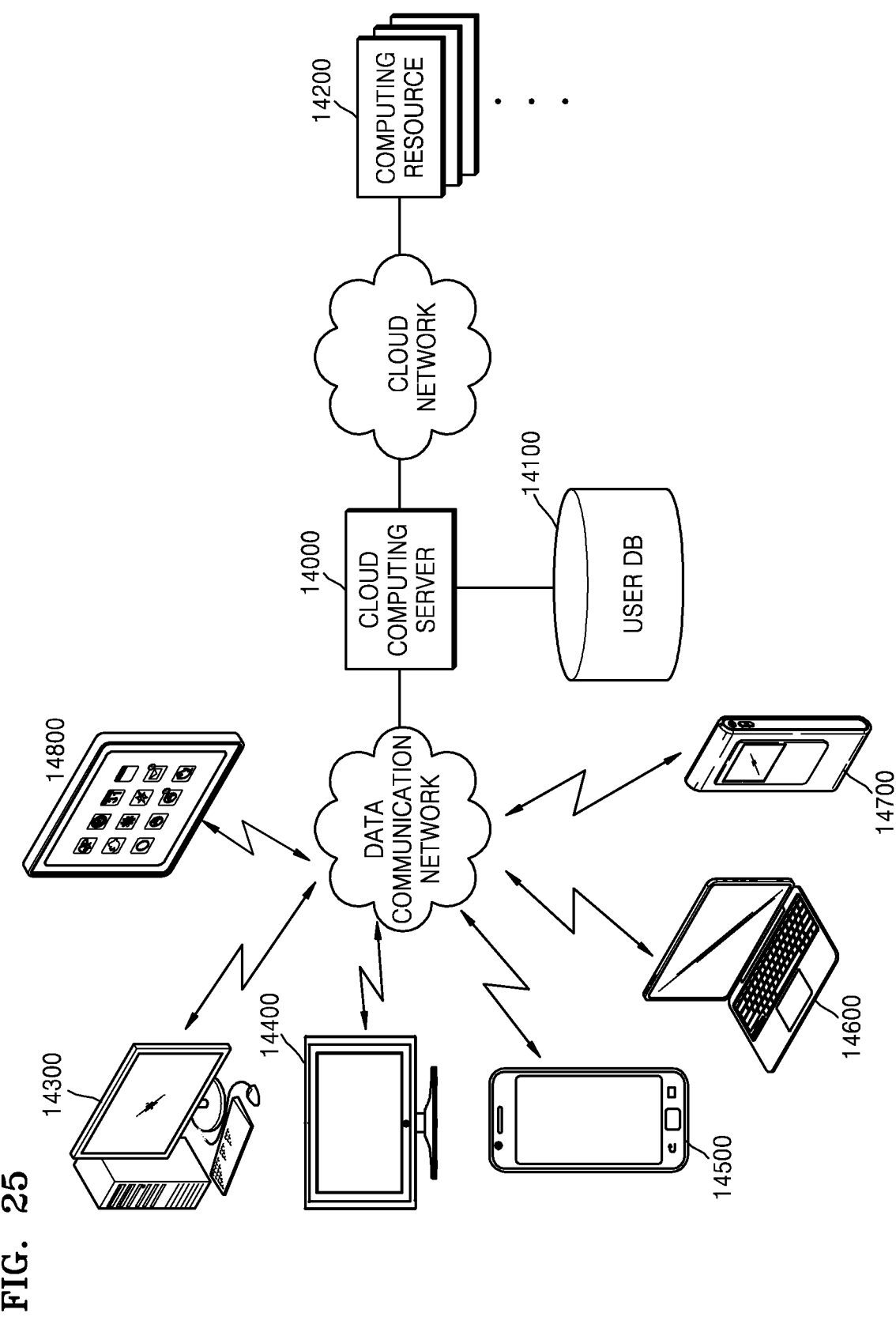
FIG. 25 illustrates a network structure of a cloud computing system using the video encoding apparatus and the video decoding apparatus, according to an embodiment.

FIG. 25 illustrates a network structure of a cloud computing system using a video encoding apparatus and a video decoding apparatus, according to various embodiments.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 23.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. On the other hand, if the user terminal requests to reproduce the video, starting from the pausing point thereof, the cloud computing server 14000 transmits streaming data of the video starting from a frame corresponding to the pausing point, to the user terminal.

In this regard, the user terminal may include the video decoding apparatus as described above with reference to FIGS. 1A through 18. As another example, the user terminal may include the video encoding apparatus as described above with reference to FIGS. 1A through 18. Alternatively, the user terminal may include both the video encoding apparatus and the video decoding apparatus as described above with reference to FIGS. 1A through 18.

Various applications of the video encoding method, the video decoding method, the video encoding apparatus, and the video decoding apparatus described above are described above with reference to FIGS. 1A through 18. However, embodiments of methods of storing the video encoding method and the video decoding method in a storage medium or embodiments of methods of implementing the video encoding apparatus and the video decoding apparatus in a device described above with reference to FIGS. 1A through 18 are not limited to the embodiments of FIGS. 19 through 25.

While the present disclosure has been particularly shown and described with reference to specific embodiments thereof, it will be understood by one of ordinary skill in the art that various changes in form and details may be made therein without departing from the spirit and scope of the disclosure as defined by the following claims. The embodiments should be considered in a descriptive sense only and not for purposes of limitation. Therefore, the scope of the disclosure is defined not by the detailed description of the disclosure but by the following claims, and all differences within the scope will be construed as being included in the present disclosure.

The invention claimed is:

1. A method of decoding a multi-view image, the method comprising:

obtaining an inter skip flag of a current block from a bitstream, the inter skip flag indicating whether the current block included in a depth image of the multi-view image is to be reconstructed based on an inter skip mode;

obtaining an intra skip flag of the current block from the bitstream only when the inter skip flag indicates that the current block is not to be reconstructed based on the inter skip mode, the intra skip flag indicating whether the current block included in the depth image of the multi-view image is to be reconstructed based on an intra skip mode;

when the intra skip flag indicates that the current block is to be reconstructed based on the intra skip mode, obtaining intra skip prediction mode information from the bitstream, the intra skip prediction mode information indicating an intra prediction mode to be used for the current block, from among a plurality of intra prediction modes;

determining predicted values of samples included in the current block according to an intra prediction method indicated by the intra skip prediction mode information; and reconstructing the current block by determining reconstructed values of the samples, based on the predicted values of the samples.

2. The method of claim 1, wherein, when the intra skip flag indicates that the current block is to be reconstructed according to the intra skip mode, residual data is not obtained.

3. The method of claim 1, wherein the intra skip prediction mode information indicates a horizontal mode, a vertical mode, a horizontal single mode, or a vertical single mode.

4. The method of claim 3, wherein the determining of the predicted values of the samples comprises determining predicted values of the samples included in the current block to be the same as a value of a sample located in the same row as the samples included in the current block, from among samples adjacent to a left side of the current block, when the intra skip prediction mode information indicates the horizontal mode, determining predicted values of the samples included in the current block to be the same as a value of a sample located in the same column as the samples included in the current block, from among samples adjacent to an upper side of the current block, when the intra skip prediction mode information indicates the vertical mode, determining predicted values of the samples included in the current block to be the same as a value of a sample located at a predetermined position, from among the samples adjacent to the left side of the current block, when the intra skip prediction mode information indicates the horizontal single mode, and determining predicted values of the samples included in the current block to be the same as a value of a sample located at a predetermined position, from among the samples adjacent to the upper side of the current block, when the intra skip prediction mode information indicates the vertical single mode.

5. An apparatus for decoding a multi-view image, the apparatus comprising:

an inter skip flag obtainer configured to obtain an inter skip flag of a current block from a bitstream, the inter skip flag indicating whether the current block included in a depth image of the multi-view image is to be reconstructed based on an inter skip mode;

an intra skip flag obtainer configured to obtain an intra skip flag of the current block from a bitstream only when the inter skip flag indicates that the current block is not to be reconstructed based on the inter skip mode, the intra skip flag indicating whether the current block included in the depth image of the multi-view image is to be reconstructed based on an intra skip mode;

an intra skip prediction mode information obtainer configured to obtain intra skip prediction mode information from the bitstream when the intra skip flag indicates that the current block is to be reconstructed according to the intra skip mode, the intra skip prediction mode information indicating an intra prediction mode to be used for the current block, from among a plurality of intra prediction modes;

a predicted-value determiner configured to determine predicted values of samples included in the current block according to an intra prediction method indicated by the intra skip prediction mode information; and a reconstructor configured to determine reconstructed values of the samples, based on the predicted values of the samples.

6. A non-transitory computer-readable recording medium having recorded thereon a program for performing the method of claim 1.

* * * * *